US012407126B2

(12) United States Patent
Li et al.

(10) Patent No.: US 12,407,126 B2
(45) Date of Patent: Sep. 2, 2025

(54) LOW PROFILE WIRE CONNECTOR

(71) Applicant: Hubbell Incorporated, Shelton, CT (US)

(72) Inventors: Jian Hua Li, Bayside, NY (US); Krishna Patel, Granger, IN (US)

(73) Assignee: Hubbell Incorporated, Shelton, CT (US)

( * ) Notice: Subject to any disclaimer, the term of this patent is extended or adjusted under 35 U.S.C. 154(b) by 348 days.

(21) Appl. No.: 18/082,307

(22) Filed: Dec. 15, 2022

(65) Prior Publication Data

US 2023/0198192 A1 Jun. 22, 2023

Related U.S. Application Data

(60) Provisional application No. 63/291,100, filed on Dec. 17, 2021.

(51) Int. Cl.
*H01R 13/506* (2006.01)
*H01R 4/48* (2006.01)
(Continued)

(52) U.S. Cl.
CPC ........... *H01R 13/506* (2013.01); *H01R 4/484* (2023.08); *H01R 13/04* (2013.01); *H01R 24/28* (2013.01);
(Continued)

(58) Field of Classification Search
CPC .. H01R 4/484; H01R 4/48185; H01R 4/4809; H01R 4/4821; H01R 4/4852;
(Continued)

(56) References Cited

U.S. PATENT DOCUMENTS 4,516,817 A 5/1985 Deters
4,602,834 A 7/1986 Hahn et al.
(Continued)

FOREIGN PATENT DOCUMENTS

CN 207753189 8/2018
CN 213584390 6/2021

OTHER PUBLICATIONS

International Search Report and Written Opinion mailed in PCT/US17/53013 on Dec. 7, 2017 (6 pages).
(Continued)

*Primary Examiner* — Gary F Paumen
(74) *Attorney, Agent, or Firm* — Wissing Miller LLP

(57) ABSTRACT

The present disclosure provides descriptions of configurations for wire connectors used to splice low voltage electrical conductors or to splice high voltage electrical conductors. The wire connectors may be coupled to form a wire connector assembly. Each wire connector includes a base, a cover, a first cover coupling assembly and a second first cover coupling assembly. The base has an upper wall and a lower wall and can be divided into a first end portion, a second end portion and a central portion between the first end portion and the second end portion. The cover has a main cover member, a first movable cover member movably connected to a first side of the main cover member and a second movable cover member movably connected to a second side of the main cover member. The main cover member includes a plurality of contact chambers, where each contact chamber includes at least one electrical contact positioned within a cavity of the contact chamber. The first cover coupling assembly is associated with the first end portion of the base and the first movable cover member of the cover. The second cover coupling assembly is associated with the second end portion of the base and the second movable cover member of the cover. The cover assemblies
(Continued)

are used to releasably couple the movable cover members to the base.

16 Claims, 27 Drawing Sheets

(51) Int. Cl.
*H01R 13/04* (2006.01)
*H01R 24/28* (2011.01)

(52) U.S. Cl.
CPC .......... *H01R 4/4821* (2023.08); *H01R 4/4848* (2023.08); *H01R 4/485* (2023.08); *H01R 4/4852* (2023.08)

(58) Field of Classification Search
CPC .... H01R 4/4848; H01R 4/485; H01R 13/506; H01R 13/04; H01R 24/28
USPC .................................................. 439/625, 441
See application file for complete search history.

(56) References Cited

U.S. PATENT DOCUMENTS

| | | | | |
|---|---|---|---|---|
| 5,033,976 | A | 7/1991 | Sarian et al. | |
| 5,435,747 | A | 7/1995 | Franckx et al. | |
| 5,545,054 | A | 8/1996 | Benes et al. | |
| 5,675,940 | A | 10/1997 | Bahar et al. | |
| 5,782,655 | A | 7/1998 | Stefaniu et al. | |
| 6,024,605 | A | 2/2000 | Beck et al. | |
| 6,132,238 | A | 10/2000 | Hartmann et al. | |
| 6,419,368 | B1 | 7/2002 | Guttenberger et al. | |
| 6,544,070 | B1 | 4/2003 | Radliff | |
| 6,695,639 | B2 | 2/2004 | Castaldo et al. | |
| 6,761,589 | B2 | 7/2004 | Venditti et al. | |
| 6,783,386 | B2 | 8/2004 | Clement | |
| 6,860,752 | B2 * | 3/2005 | McCoy ................ | H01R 4/4833 439/441 |
| 7,080,985 | B2 | 7/2006 | Hopper | |
| 7,101,218 | B2 | 9/2006 | Castaldo et al. | |
| 7,140,905 | B2 | 11/2006 | Castaldo | |
| 7,281,942 | B2 * | 10/2007 | Swedberg ............ | H01R 4/4833 439/441 |
| 7,753,718 | B2 * | 7/2010 | Bethurum ............ | H01R 13/506 439/441 |
| 7,798,846 | B2 | 9/2010 | Yuan | |
| 7,927,129 | B2 | 4/2011 | Gimbel | |
| 7,938,677 | B1 | 5/2011 | Zhu | |
| 7,976,330 | B2 * | 7/2011 | Lin .................... | H01R 13/6273 439/441 |
| 8,794,994 | B2 * | 8/2014 | Kollmann .............. | H01R 13/42 439/441 |
| 8,814,605 | B2 | 8/2014 | Yu et al. | |
| 8,979,574 | B2 | 3/2015 | Daily, Jr. et al. | |
| 9,130,295 | B2 | 9/2015 | Nhu et al. | |
| 9,496,660 | B2 | 11/2016 | Kao | |
| 9,590,363 | B2 | 3/2017 | Wu et al. | |
| 10,033,119 | B2 * | 7/2018 | Koellmann ............ | H01R 4/484 |
| 10,164,349 | B2 * | 12/2018 | Koellmann .......... | H01R 4/4821 |
| 10,170,860 | B2 | 1/2019 | Johnson et al. | |
| 11,336,036 | B2 * | 5/2022 | Meyer .................. | H01R 4/4821 |
| 2004/0038582 | A1 | 2/2004 | Castaldo et al. | |
| 2004/0074745 | A1 | 4/2004 | Castaldo | |
| 2010/0124395 | A1 | 5/2010 | Lin et al. | |
| 2010/0233900 | A1 | 9/2010 | Gimbel | |
| 2011/0053406 | A1 * | 3/2011 | Lin ...................... | H01R 4/4826 439/358 |
| 2013/0022318 | A1 | 1/2013 | Fingler et al. | |
| 2014/0170897 | A1 | 6/2014 | Nonen | |
| 2016/0079714 | A1 | 3/2016 | Wu | |
| 2016/0187591 | A1 | 6/2016 | Fortusini et al. | |
| 2021/0257752 | A1 | 8/2021 | Meyer et al. | |

OTHER PUBLICATIONS

WAGO Corporation Brochure, “Electrical Installation Products: Splicing Connectors and Chassis Mount Terminal Blocks”, 28 pages, Jul. 5, 2016 (based upon Internet archive Wayback machine.).
International Search Report and Written Opinion Mailed in corresponding PCT/US22/53025 on Apr. 13, 2023 (10 pages).
International Preliminary Report on Patentability in corresponding International Application No. PCT/US2022/053025 mailed Jun. 27, 2024 (8 pages).

* cited by examiner

Fig. 2
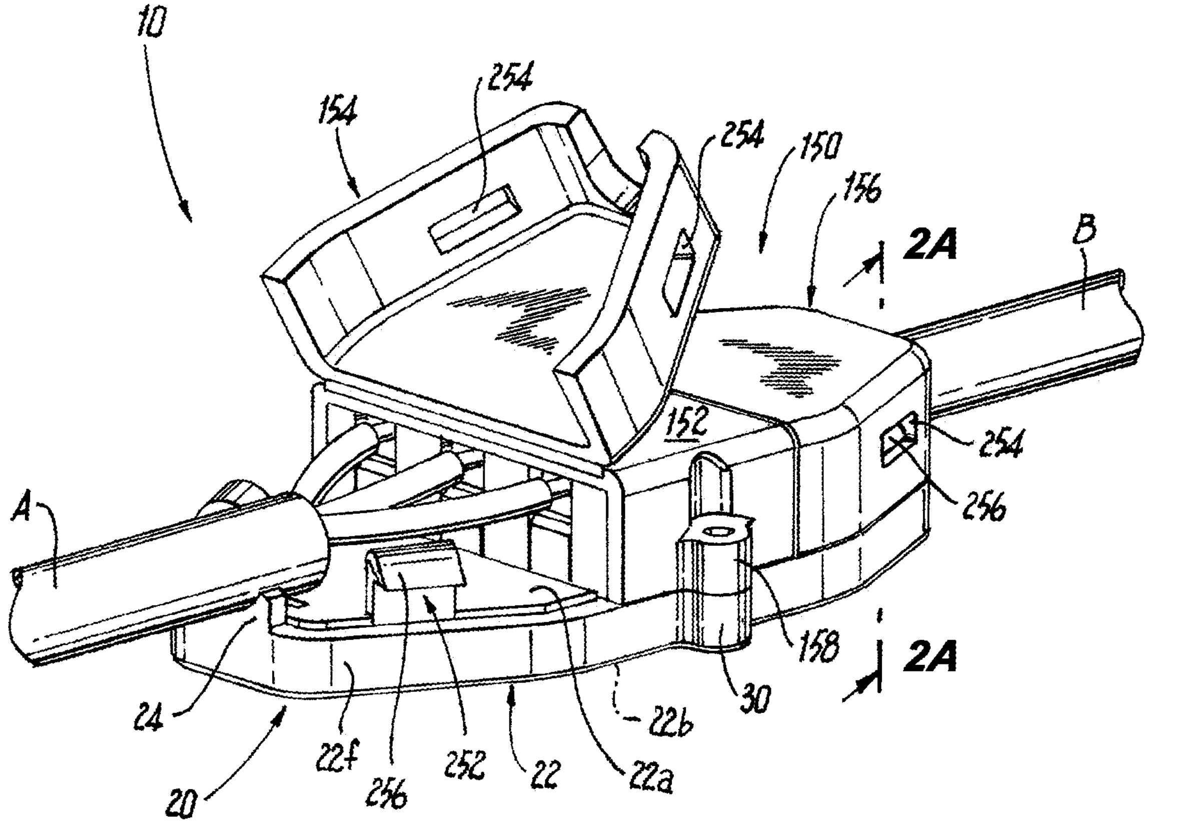
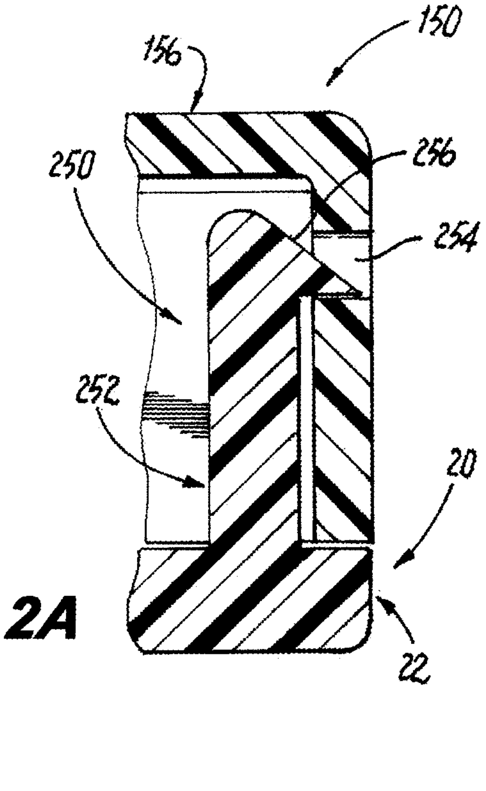
Fig. 2A

Fig. 19
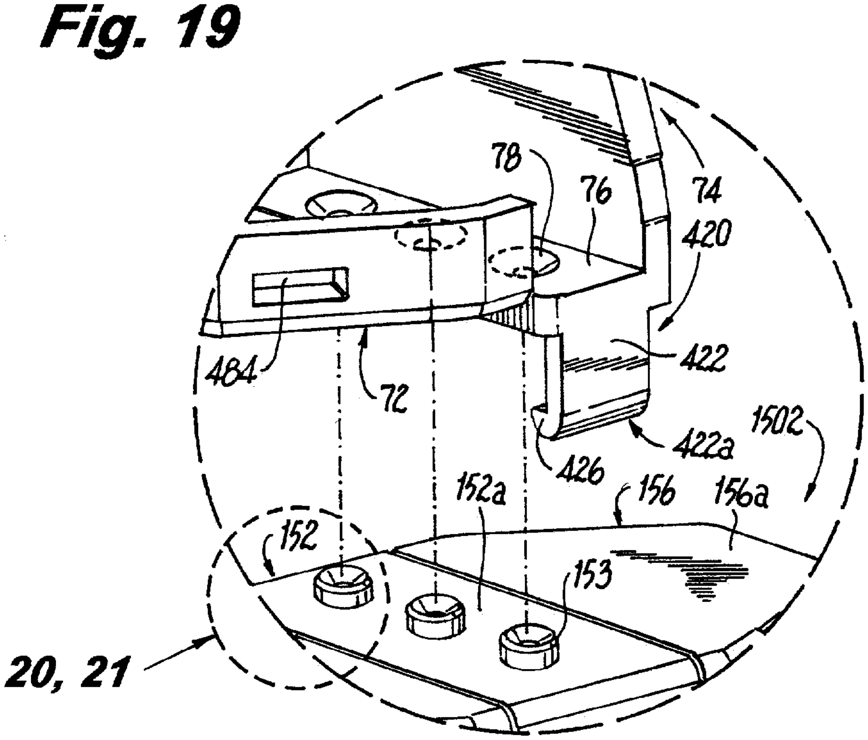
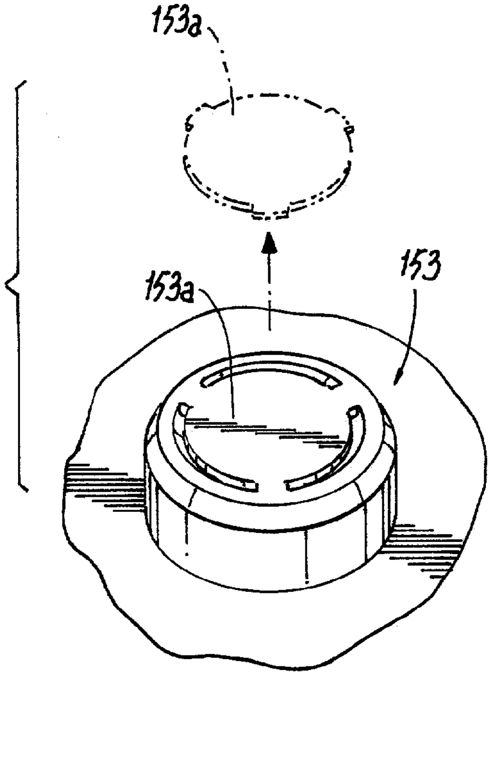
Fig. 20
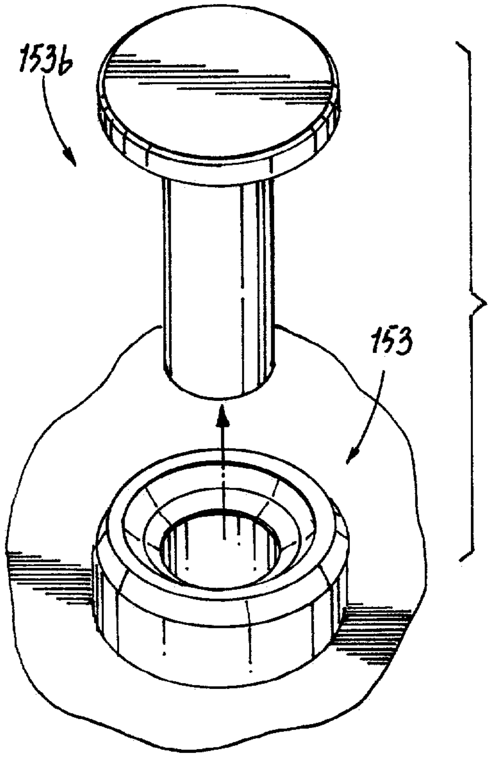
Fig. 21

Fig. 25
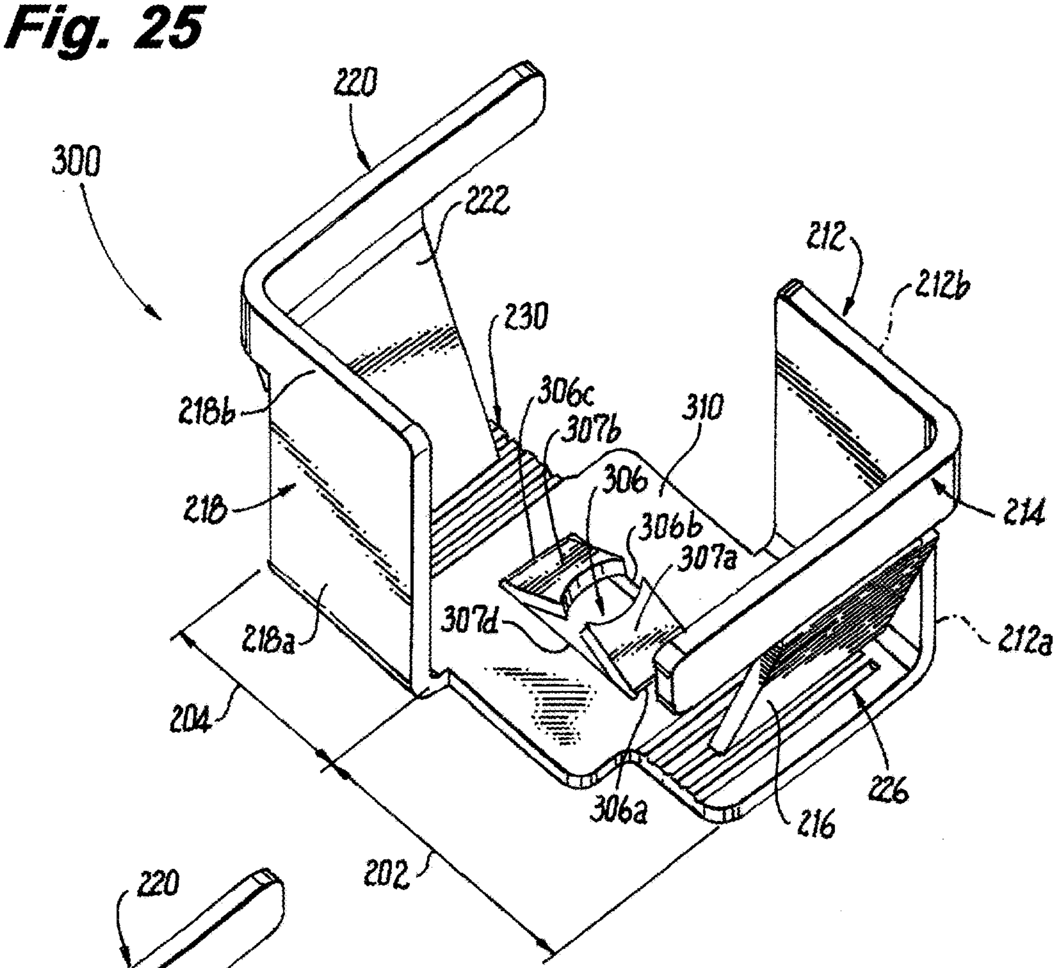
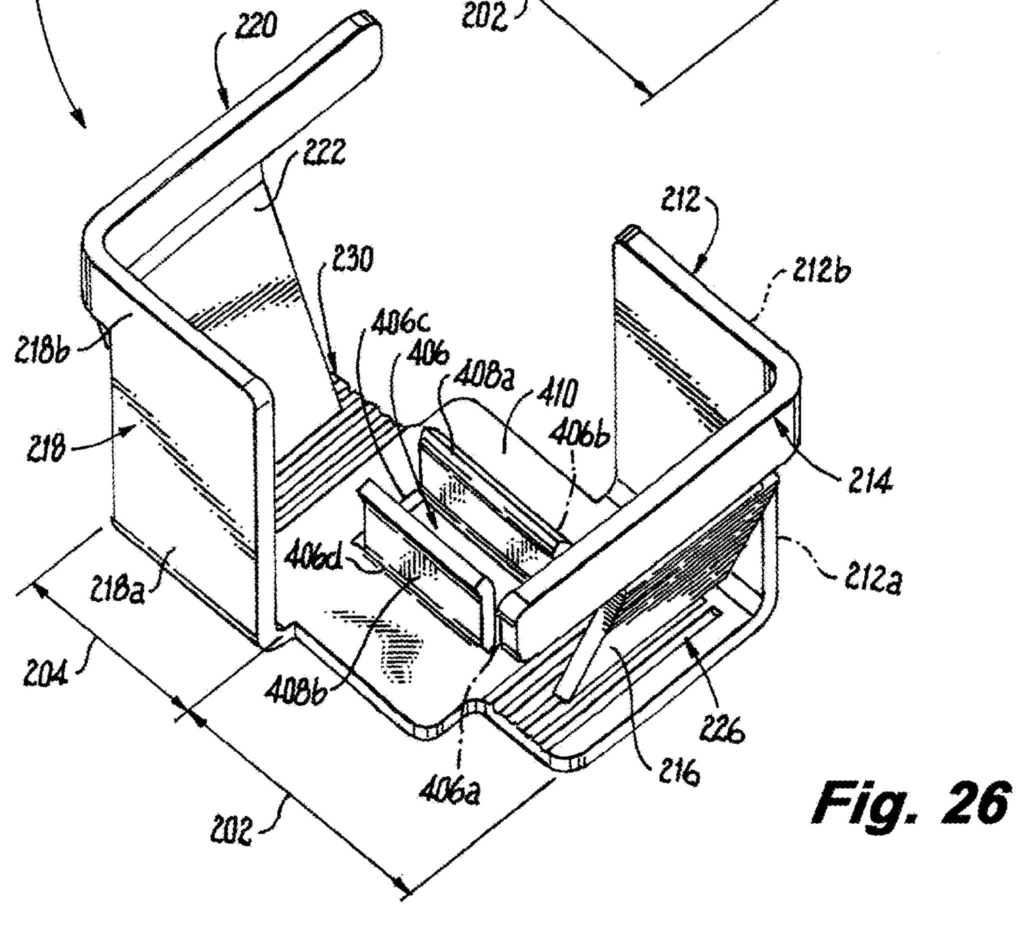
Fig. 26

Fig. 27
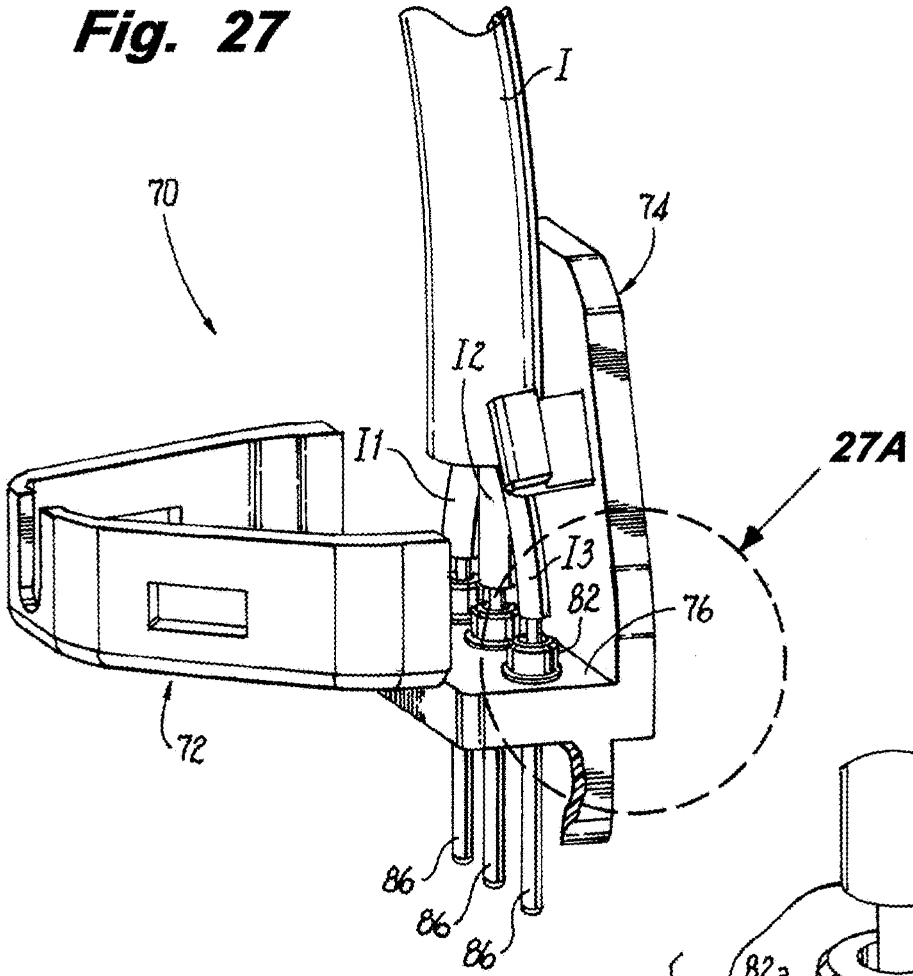
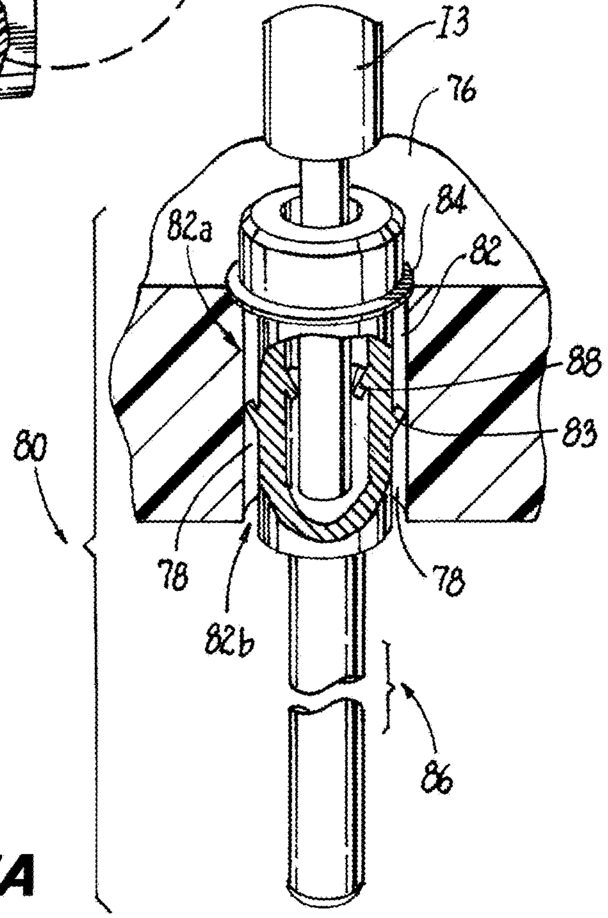
Fig. 27A

LOW PROFILE WIRE CONNECTOR

CROSS-REFERENCE TO RELATED APPLICATIONS

The present disclosure is based on and claims benefit from U.S. Provisional Patent Application Ser. No. 63/291,100 filed on Dec. 17, 2021 entitled "Low Profile Wire Connector" the contents of which are incorporated herein in their entirety by reference.

BACKGROUND

Field

The present disclosure relates generally to wire connectors, and more particularly to low-profile wire connectors used to connect low voltage wires and line voltage wires.

Description of the Related Art

More and more buildings, homes, etc. are being built utilizing smart building technology. Such smart building technology includes but is not limited to Light-Emitting-Diode (LED) lighting, fluorescent lighting including dimming systems as well as other power, control and signal circuits. To control smart building technology, generally low voltage control/signal wiring (sometimes referred to generally as low voltage wiring or control conductors) and line voltage wiring (sometimes referred to generally as power conductors) are run throughout the building, home, etc.

Current electrical code requires a divider to exist in a junction box and connectors to electrically isolate the low voltage wiring (e.g., about 42.4V AC max or about 30V DC max) from the line voltage (e.g., from about 120 VAC to about 277 VAC) wiring. Such a divider is generally a thin plastic or metal wall. The wire runs for control/signal circuits and power circuits are also required to be in separate sheathing, e.g., metal-sheathing.

Recently, approved cables have been introduced to the market that have a double insulated set of low voltage wires and a double insulated set of line voltage wires. An example of such a cable is an MC-PCS cable. The set of low voltage wires are individually insulated by insulating jackets and a second insulating sleeve or jacket surrounds the set. Likewise, the set of line voltage wires are individually insulated by insulating jackets and a second insulating sleeve or jacket surrounds the set. Both the low voltage wires and the line voltage wires run in the same protective sheathing, e.g., metal-sheathing, to save cost. Separator tape may also be provided between the wires and the inside of the sheathing. The low voltage wires typically carry control signals such as control signals used for LED lighting systems or other smart building technology. The line voltage wires typically carry power.

The low voltage wires are generally smaller in diameter than the line voltage wires. For example, the line voltage wires are generally 10 to 14 AWG wires while the low voltage wires are generally 18 to 24 AWG wires. The line voltage wires and the low voltage wires may be solid or stranded depending on a particular application.

Since low voltage wires are run in the same conduit as line voltage wires, there is a concern that electricity from the line voltage wires may jump to the low voltage wires, which may cause hazardous conditions, such as fire or equipment damage. The National Electrical Code (NEC) that governs the separation of cables of this type is NEC Section 725.136.

This Section of the NEC specifies either, 1) a separation of 0.25 inches between the low voltage wires and line voltage wires, or 2) the insulation of the low voltage wires have the same insulation factor as those used for line voltage wires, e.g., 30 mil jacket over the low voltage wires, which is the same cumulative thickness as those used for line voltage wires.

Low voltage wires inside the same outer sheathing as the line voltage wires satisfy the NEC by using the same 30 mil insulation jacket to achieve the same insulation thickness as the line voltage wires. However, inside an electrical junction box where the low voltage wires are typically removed from the sheathing and a portion stripped and spliced with other low-voltage wires, the NEC requirement to maintain the integrity of the cumulative insulation thickness cannot be satisfied with the same insulator type because some of the insulation jacket has been stripped off. Thus, there is a need for a termination connection device that satisfies the insulation thickness or spacing requirement for these types of jacketed sets of insulated control conductors from the high voltage power conductors of the unsheathed portions of these cables.

SUMMARY

The present disclosure provides exemplary embodiments for low profile wire connectors and wire connector assemblies used for splicing low voltage electrical conductors or high voltage electrical conductors. In one exemplary embodiment, a wire connector includes a base, a cover, first cover coupling assembly and second cover coupling assembly. The base includes a first end portion, a second end portion and a central portion between the first and second portions. The base also includes an upper wall and a lower wall. The cover includes a main cover member, a first movable cover member movably connected to a first side of the main cover member and a second movable cover member movably connected to a second side of the main cover member. The cover is attached to the base such that the main cover member is associated with the central portion of the base, the first movable cover member is associated with the first end portion of the base and the second movable cover member is associated with the second end portion of the base. The main cover member of the cover includes a plurality of contact chambers. Each contact chamber includes at least one electrical contact positioned within a cavity of the contact chamber, a first passage to the first end portion of the base and a second passage to the second end portion of the base. The first cover coupling assembly is associated with the first end portion of the base and the first movable cover member of the cover. The first cover coupling assembly is used to releasably couple the first movable cover member to the first end portion of the base. The second cover coupling assembly is associated with the second end portion of the base and the second movable cover member of the cover. The second cover coupling assembly is used to releasably couple the second movable cover member to the first end portion of the base.

An exemplary of a wire connector assembly includes a first wire connector described above and a second wire connector described above, where the base of the first wire connector is attached to the base of the second wire connector.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 2 is a perspective view of the wire connector of FIG. 1, illustrating a cover of the low-profile wire connector in an open position;

FIG. 2A is a cross-sectional view of a portion of the wire connector of FIG. 2 taken from detail 2A of FIG. 2, and illustrating an exemplary embodiment of a cover coupling assembly according to the present disclosure;

FIG. 19 is an enlarged top plan view of a portion of the cover and supplemental wire connector of FIG. 18 taken from detail 19 of FIG. 18, and illustrating the conductors of the supplemental wire connector aligned to enter the cover;

FIG. 20 is an enlarged top plan view of an aperture of the cover of FIG. 19 taken from detail 20 of FIG. 19, and illustrating the aperture configured with a knockout;

FIG. 21 is an enlarged top plan view of an aperture of the cover of FIG. 19 taken from detail 21 of FIG. 19, and illustrating the aperture configured with a plug;

FIG. 25 is an enlarged top perspective view of an exemplary embodiment of an electrical contact of FIG. 23, illustrating contact grips configured to electrically connect a conductor of the supplemental wire connector with the electrical contact;

FIG. 26 is an enlarged top perspective view of an exemplary embodiment of an electrical contact of FIG. 23, illustrating two contact fingers configured to electrically connect a conductor of the supplemental wire connector with the electrical contact;

FIG. 27 is a side perspective view of an exemplary embodiment of a supplemental wire connector of FIG. 18, illustrating the conductors of cable I inserted into a connector contact that is housed within the aperture;

FIG. 27*a* is an enlarged cross-sectional view of the connector contact housed in the aperture of FIG. 27 taken from detail 27*a* of FIG. 27, and illustrating the conductor being gripped by two teeth of the connector contact electrically connecting the conductor to the connector contact;

DETAILED DESCRIPTION

Figure 1:
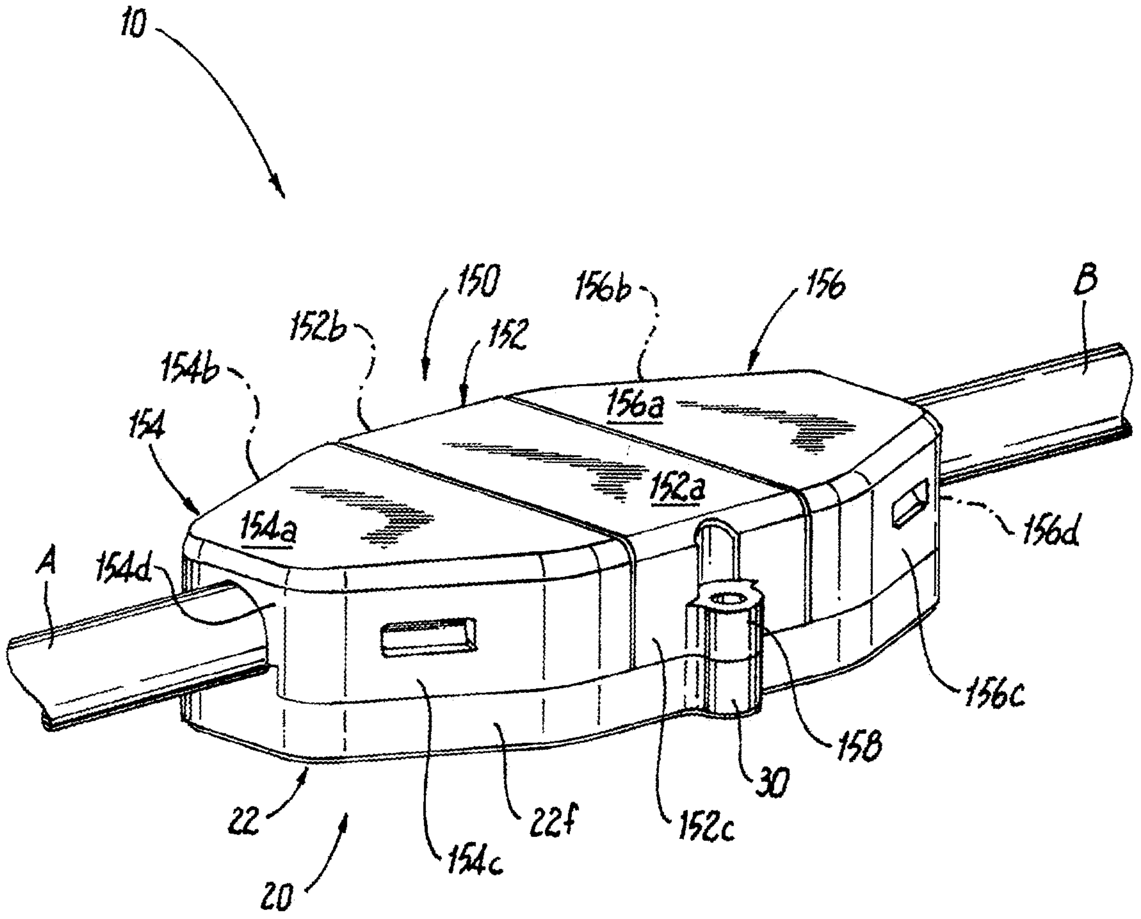
FIG. 1 is a perspective view of an exemplary embodiment of a low-profile wire connector according to the present disclosure.

The present disclosure provides descriptions of embodiments for low profile wire connectors used for splicing electrical conductors in cabling having at least one control conductor and at least one power conductor. This disclosure and the accompanying drawings are to be regarded in an illustrative sense rather than a restrictive sense. Various modifications may be made thereto without departing from the spirit and scope of the present disclosure.

Referring to FIGS. 1-7, an exemplary embodiment of a low-profile wire connector 10 according to the present disclosure is shown. The wire connectors 10 are configured to connect or splice electrical cables A and B, seen in FIG. 1, to each other. The electrical cables A and B may include a set of electrical conductors rated for line voltages that supply electrical power, or the electrical cables A and B may include a set of electrical conductors rated for low voltages to provide control signals. As a non-limiting example, the line voltage conductors may be 10 AWG to 14 AWG conductors, and the low voltage conductors may be 18 AWG to 24 AWG conductors. In the exemplary embodiment shown, the cable A includes a set of electrical conductors A1, A2, A3 that are individually insulated by a first insulating sleeve or jacket with a second insulating sleeve or jacket surrounding the set. Similarly, cable B includes a set of electrical conductors B1, B2, B3 that are individually insulated by a first insulating sleeve or jacket with a second insulating sleeve or jacket surrounding the set.

Continuing to refer to FIGS. 1-7, in this exemplary embodiment, the wire connector 10 includes a base 20 and a cover 150. The base 20 and cover 150 of each wire connector 10 are made of an electrical insulating material. As a non-limiting example, the insulating material for the base 20 and cover 150 may have an insulation factor that is the same insulation factor as the insulation jackets of the line voltage conductors. In addition to or another non-limiting example, is that the base 20 and cover 150 may be dimensioned to provide a minimum 0.25 of an inch physical separation between the low voltage conductors and the line voltage conductors when a first wire connector 10 splicing low voltage conductors is coupled to a second wire connector 10 splicing line voltage conductors. The wire connectors 10 may also include one or more cover coupling assemblies 50, seen in FIG. 2A, and one or more base coupling assemblies, e.g., base coupling assemblies 320 and 330, seen in FIGS. 11-14. Each of the one or more cover coupling assemblies 50 is used to releasably or permanently secure a portion of the cover 150 to the base 20. Each of the one or more base coupling assemblies, e.g., base coupling assemblies 320 and 330, is used to releasably or permanently secure a base 20 of one wire connector 10 to a base 20 of another wire connector 10 as described in more detail hereinbelow.

Figure 3:
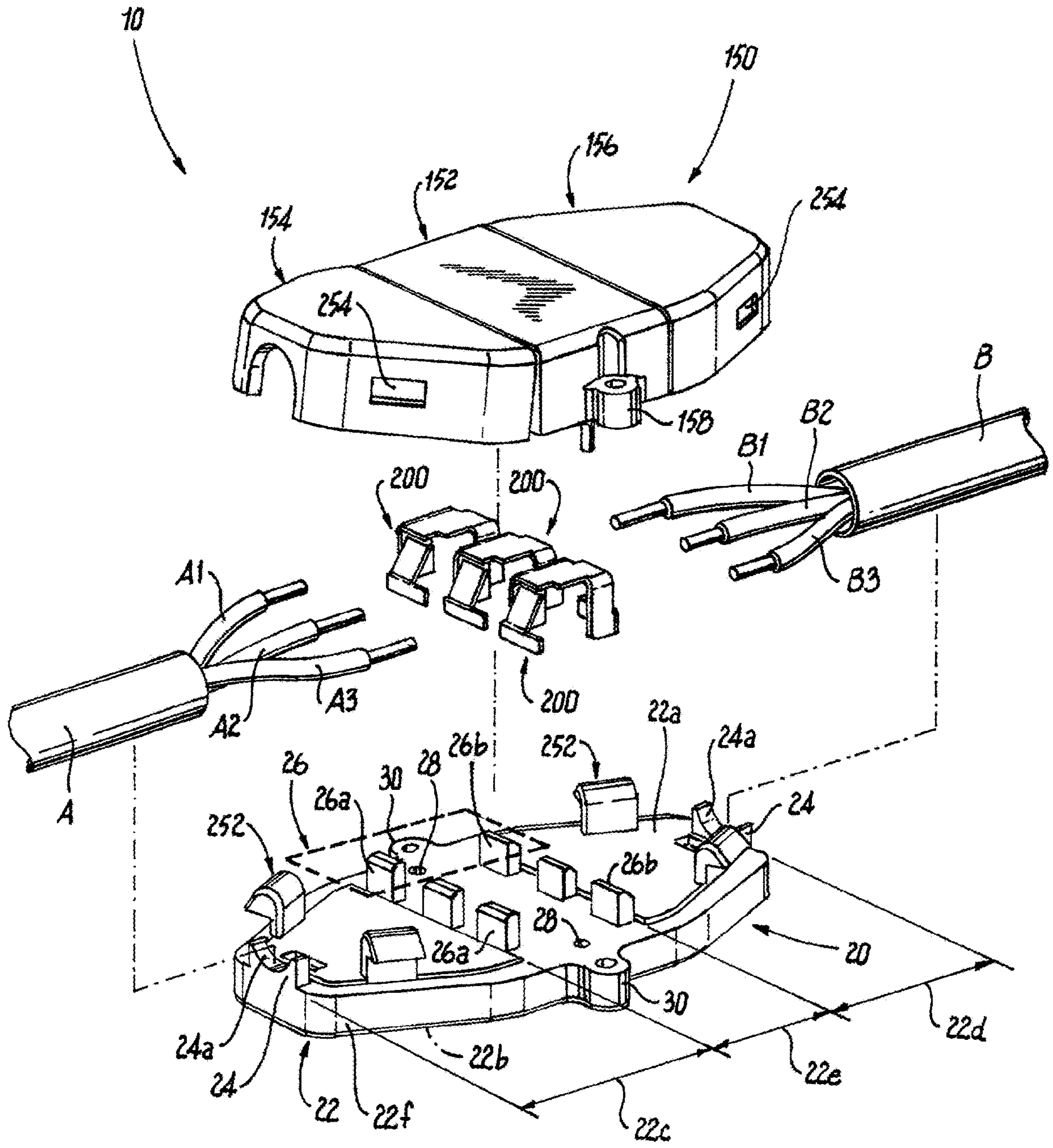
FIG. 3 is an exploded top perspective view of the wire connector of FIG. 1, illustrating electrical cables and components of the low profile wire connector including a cover, a base and electrical contacts.
Figure 4:
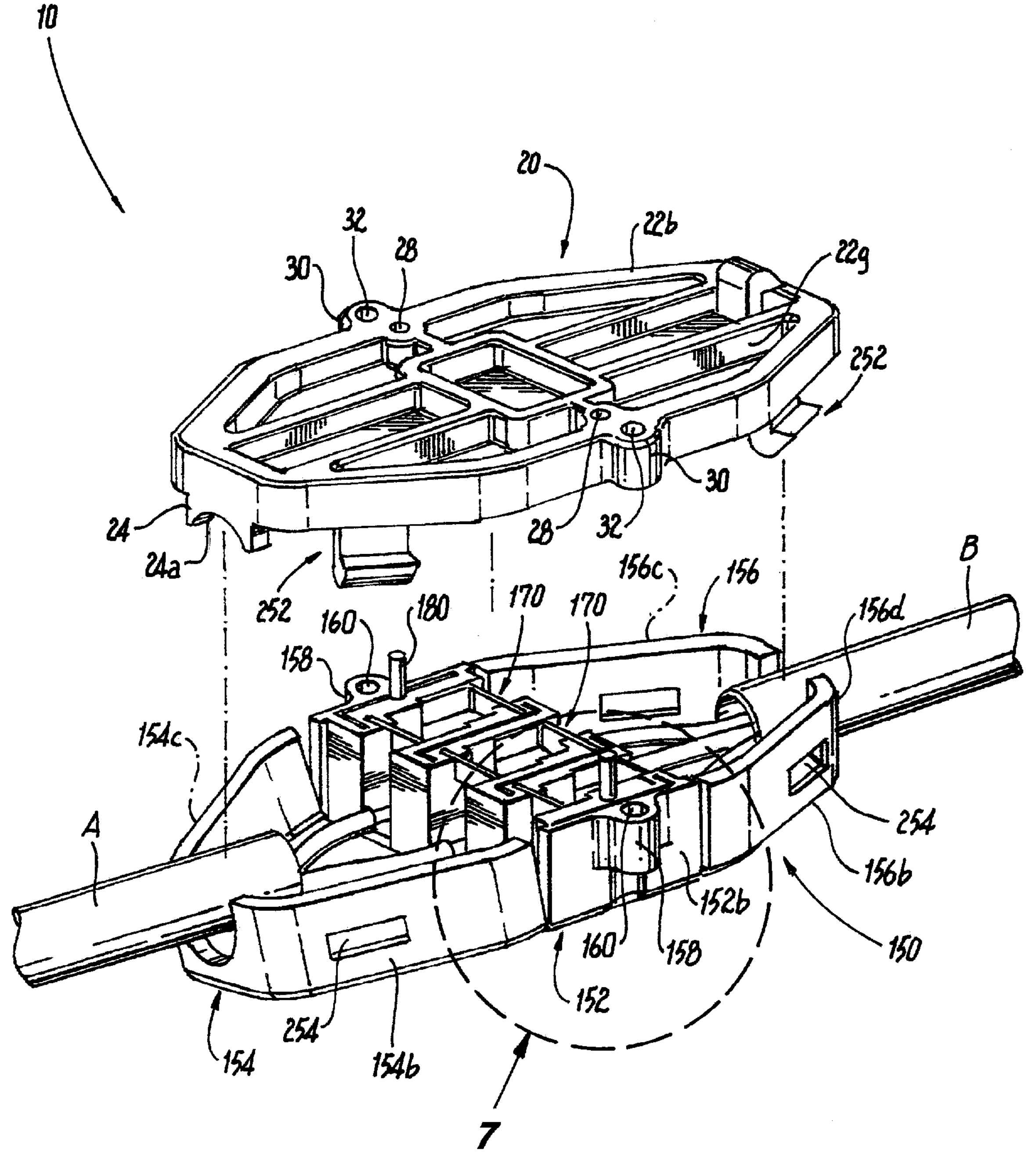
FIG. 4 is an exploded bottom perspective view of the wire connector of FIG. 1, illustrating electrical cables and components of the low profile wire connector including a cover, a base and electrical contacts positioned in contact chambers of the cover.

Referring to FIGS. 2-4, the base 20 has a body 22 that in the embodiment shown is a substantially flat or planar structure or platform having an upper wall 22*a*, a lower wall 22*b*, and an outer wall 22*f*. For ease of description, the body 22 may be divided into a first end portion 22*c*, a second end portion 22*d* and a central portion 22*e* between the first end portion 22*c* and the second end portion 22*d*. The body 22 may be a solid structure or, as shown in FIGS. 3 and 4, the body 22 may have a solid upper wall 22*a*, and a solid outer wall 22*f* with hollowed out portions that form one or more structural reinforcing ribs 22*g*, seen in FIG. 4. In this example, a bottom surface of the outer wall 22*f* and the one or more structural reinforcing ribs 22*g* form the lower wall 22*b* of the body 22. The hollowed-out portions reduce the material needed to manufacture the wire connectors 10 and thus reduce the cost to manufacture the wire connectors 10. The thickness of the body 22 may vary for each wire connector 10 based upon a number of factors, including the type of wires that are being connected in the wire connector 10 and the NEC insulation specifications for separating low voltage conductors from line voltage conductors. As stated previously, a minimum 0.25 of an inch physical separation between the low voltage conductors and the high voltage conductors meets the NEC specification. The thickness of the body 22 of the wire connector 10 will be described in further detail hereinbelow.

The base 20 may include one or more cable support members 24, one or more pair of tabs 26, one or more alignment apertures 28 and one or more mounting tabs 30, seen in FIG. 3. Each of the one or more cable support members 24 extends from the upper wall 22*a* of the body 22. Preferably, one of the one or more cable support members 24 is positioned at or near an outer edge of the first end portion 22*c* of the body 22, and another of the one or more cable support members 24 is positioned at or near an outer edge of the second end portion 22*d* of the body 22, as shown in FIG. 3. Each of the one or more cable support members 24 is configured to accommodate or fit at least a portion of an insulating jacket of a cable, e.g., cable A or cable B, and may include a curved surface or groove 24*a* that conforms to the shape of the cable A or cable B.

Referring to FIG. 3, the one or more pair of tabs 26 may assist in aligning the cover 150 to the base 20 when attaching the cover 150 to the base 20. When the cover 150 is attached to the base 20, each pair of tabs 26 may form a portion of a contact chamber 170, as seen in FIG. 4, in the cover 150 as described in more detail below. Each of the one or more pair of tabs 26 extend from the upper wall 22*a* of the central portion 22*e* of the body 22 and away from the body 22. Preferably, each tab 26*a* and 26*b* in the pair of tabs 26 extend from the upper wall 22*a* of the body 22 so that each tab 26*a* and 26*b* is substantially perpendicular to the upper wall 22*a*. In the embodiment shown, each tab 26*a* and 26*b* in the pair of tabs 26 is substantially planar in shape. However, the shape of each tab 26*a* and 26*b* in the pair of tabs 26 may be in any shape sufficient to assist in aligning the cover 150 to the base 20 when attaching the cover 150 to the base 20.

Continuing to refer to FIG. 3, each of the one or more alignment apertures 28 extends through or into the body 22, preferably, in the central portion 22*e* of the body. The one or more alignment apertures 28 are described in more detail below. In the event the body 22 includes the one or more mounting tabs 30, the mounting tabs 30 are integrally or monolithically formed into the outer wall 22*f* of the body 22 in the central portion 22*e* of the body 22. It is noted however, that the mounting tabs 30 may be secured to the outer wall 22*f* of the body 22 using, for example, welds. The mounting tabs 30 include an aperture 32, as seen in FIG. 4, therethrough that facilitate the securing of the base 20 to the cover 150. Preferably, an alignment aperture 28 is positioned adjacent to or in close proximity to a mounting tab 30 of the body 22.

Turning now to FIGS. 1 and 4-7, in this exemplary embodiment the cover 150 includes a main cover member 152 and one or more movable cover members that are movably connected to the main cover member 152. In the embodiment shown, the cover 150 includes two movable cover members 154 and 156 that are pivotably joined to the main cover member 152 using a living or integral hinge structure to form a unitary or monolithically structured cover 150. As such, the movable cover members 154 and 156 are capable of moving between an open position, seen in FIG. 2, and a closed position, seen in FIG. 1. As shown in FIG. 1, the movable cover member 154 is configured and dimensioned to align with the first end portion 22*c* of the body 20, movable cover member 156 is configured and dimensioned to align with the second end portion 22*d* of the body 20, and the main cover member 152 is configured and dimensioned to align with the central portion 22*e* of the body 20. The main cover member 152 includes an upper wall 152*a*, a first side wall 152*b* having one end extending from one end of the upper wall 152*a* and a second side wall 152*c* having one end extending from another end of the upper wall 152*a* so that the upper wall 152*a* and the side walls 152*b* and 152*c* form a U-shaped structure with a hollow interior. The movable cover member 154 includes an upper wall 154*a*, a first side wall 154*b* having one end extending from one end of the upper wall 154*a*, a second side wall 154*c* having one end extending from another end of the upper wall 154*a* and an end wall 154*d* joined between the side walls 154*b* and 154*c* and joined to the upper wall 154*a*. In this configuration, the upper wall 154*a*, the side walls 154*b* and 154*c* and the end wall 154*d* form a structure with a hollow interior that can receive one or more low voltage conductors or one or more high voltage conductors. Similarly, the movable cover member 156 includes an upper wall 156*a*, a first side wall 156*b* having one end extending from one end of the upper wall 156*a* and a second side wall 156*c* having one end extending from another end of the upper wall 156*a* and an end wall 156*d* joined between the side walls 156*b* and 156*c* and joined to the upper wall 156*a*. In this configuration, the upper wall 156*a*, the side walls 156*b* and 156*c* and the end wall 156*d* form a structure with a hollow interior that can receive one or more low voltage conductors or one or more high voltage conductors. In this embodiment, the upper wall 154*a* of the movable cover member 154 is joined to the upper wall 152*a* of the main cover member 152 with a living hinge, and the upper wall 156*a* of the movable cover member 156 is joined to the upper wall 152*a* of the main cover member 152 with a living hinge so that the movable cover members 154 and 156 are pivotable between the open and closed positions relative to the main cover member 152.

Figure 5:
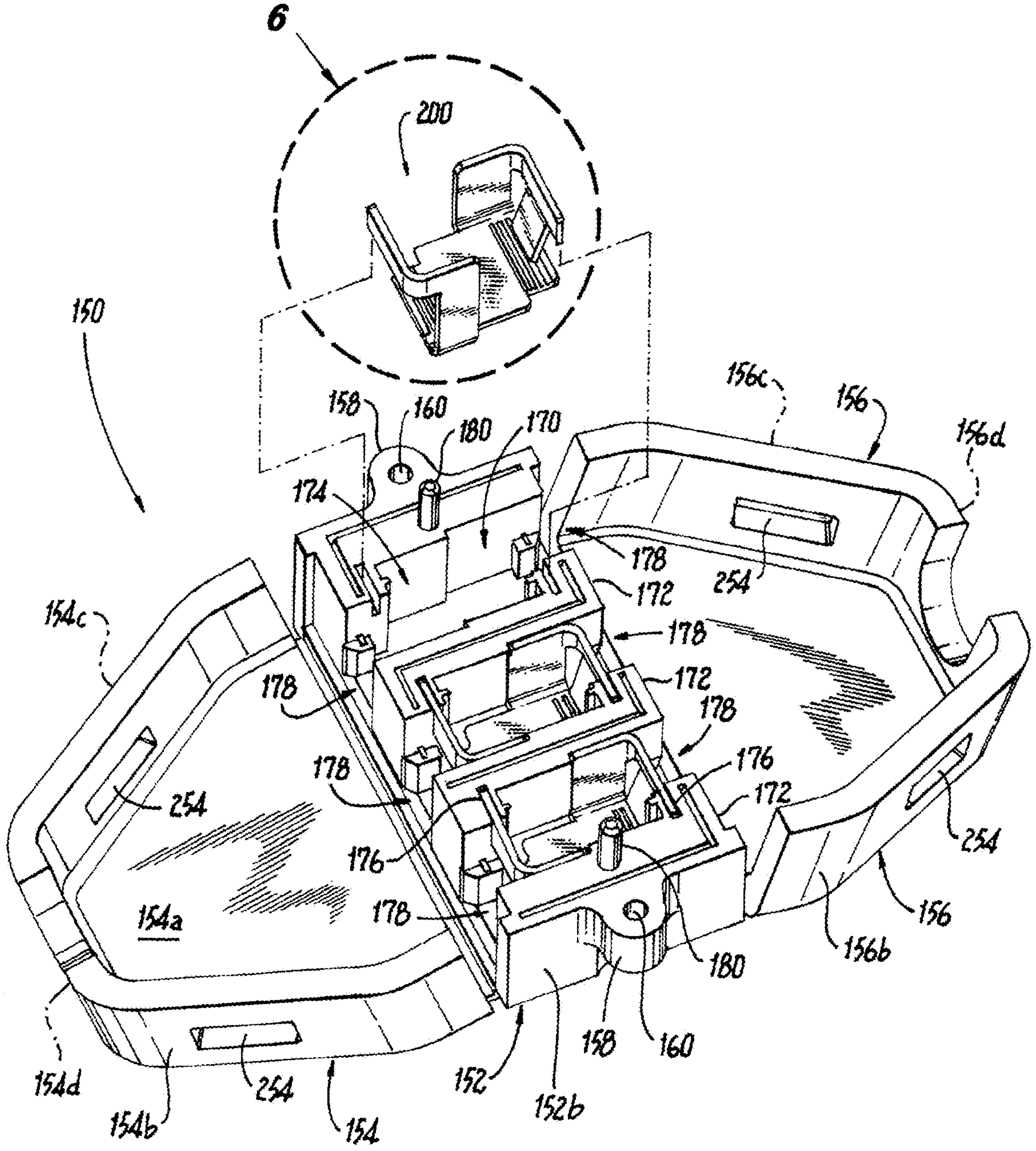
FIG. 5 is a bottom perspective view of the cover of the wire connectors of FIG. 4, illustrating that the electrical contacts removably held within the cover.

The main cover member 152 may include one or mounting tabs 158 as shown in FIG. 5. The mounting tabs 158 may be integrally or monolithically formed into the side walls 152*b* and/or 152*c* of the main cover member 152. It is noted however, that the mounting tabs 158 may be secured to the side walls 152*b* and/or 152*c* of the main cover member 152 using, for example, welds. The mounting tabs 158 include an aperture 160 therethrough that facilitate the securing of the base 20 to the cover 150. The main cover member 152 may also include one or more contact chambers 170. The one or more contact chambers 170 are positioned within the hollow interior of the main cover member 152. In the embodiment shown, there are three contact chambers 170, where each contact chamber 170 is configured and dimensioned to house a single electrical contact 200. More specifically, in the embodiment shown, each contact chamber 170 includes one or more walls 172 that define a cavity 174 in which the at least one electrical contact 200 is installed. The one or more walls 172 may be integrally or monolithically formed into main cover member 152 or the one or more walls 172 may be secured to the main cover member 152 using, for example, welds or mechanical fasteners. An example of a weld is an ultrasonic weld. Each contact chamber 170 may include one or more contact mounting structures 176 used for securing or releasably securing the at least one electrical contact 200 within the cavity 174 of the contact chamber 170. In the exemplary embodiment shown in FIG. 5, the contact mounting structures 176 are notches, channels or grooves in the walls 172 defining the particular contact chamber 170. The one or more walls 172 of each contact chamber 170 may also include one or more openings 178 that act as access points into the cavity 174 of the contact chamber 170. Preferably, the one or more openings 178 are adjacent to or in close proximity to the electrical contact 200 within the cavity 174 of the contact chamber 170. The openings 178 permit the low voltage or high voltage electrical conductors to pass through a contact chamber wall 172 to be electrically connected to the electrical contact 200 housed within the contact chamber 170. Preferably, as shown in FIG. 5, one opening 178 is disposed on one side of the contact chamber 170 so that electrical conductors in the first end portion 22*c* of the body 22 of the base 20 can be secured to an electrical contact 200, and another opening 178 is disposed on the opposite side of the contact chamber 170 so that electrical conductors in the second end portion 22*d* of the body 22 of the base 20 can be secured to a corresponding electrical contact 200 within the contact chamber 170. In addition, each opening 178 may be configured and dimensioned to receive one of the tabs 26*a* or 26*b* in the pair of tabs 26 extending from the body 22 of the base 20 to form a portion of the contact chamber wall 172. Thus, when the cover 150 is coupled or secured to the base 20, a tabs 26*a* or 26*b* is positioned between sides of the chamber walls 172 defining the opening 178 of the contact chamber 170 to at least partially block access to the electrical contact 200. As such, each tabs 26*a* or 26*b* may be spaced from another tabs 26*a* or 26*b* a distance that is equal to a thickness of the chamber wall 172 between each of the openings 178 of the contact chamber 170. Such a configuration allows the electrical contact 200 to be partly protected by one of the tabs 26*a* or 26*b* in the pair of tabs 26. The embodiment exemplified by FIG. 5 illustrates the main cover member 152 having three contact chambers 170 positioned in series, and each contact chamber 170 includes two openings 178. However, one skilled in the art would recognize that the main cover member 152 can have any number of contact chambers 170 which in turn may include any number of chamber wall openings 178.

Figure 6:
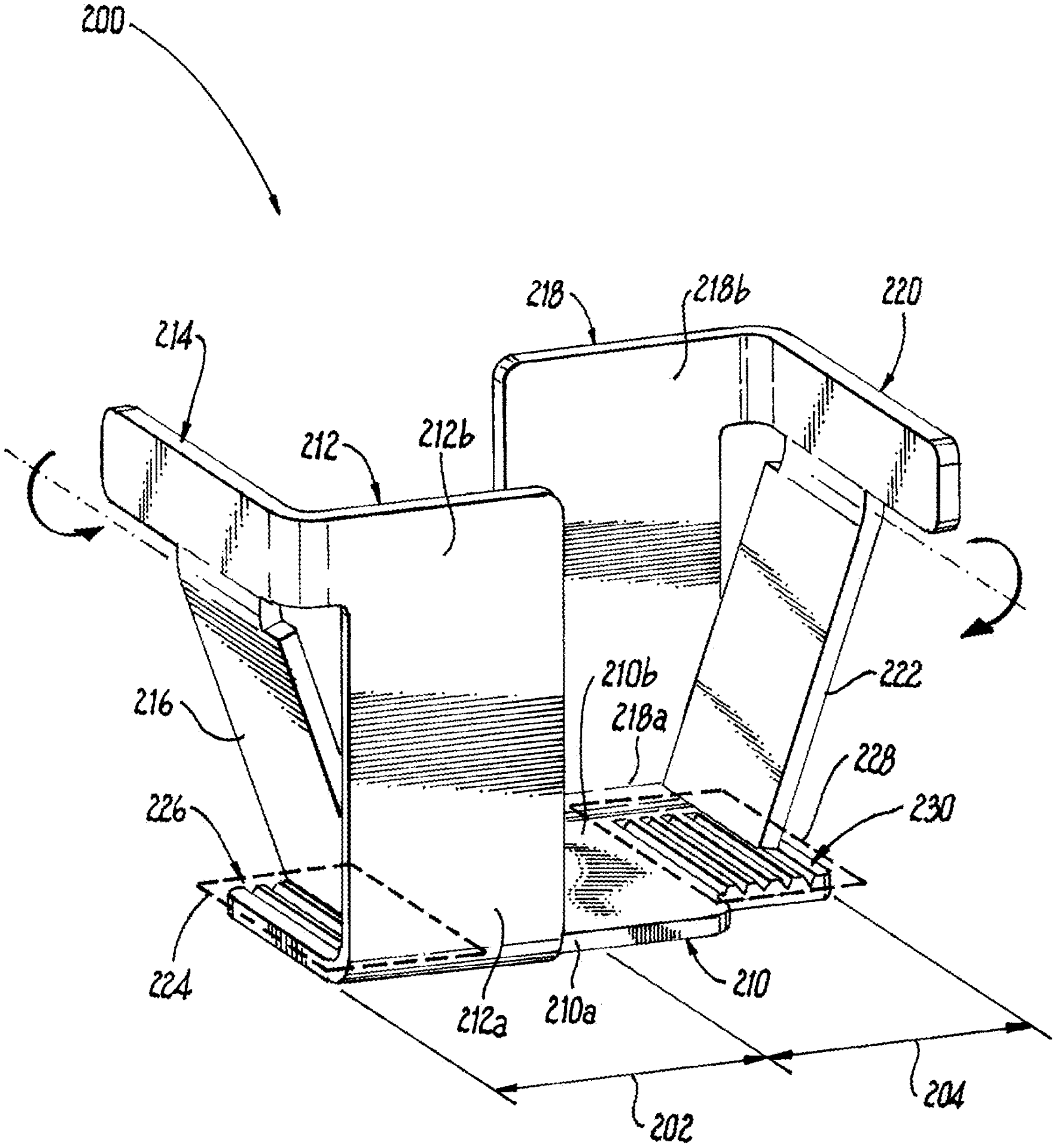
FIG. 6 is an enlarged perspective view of an exemplary embodiment of an electrical contact of FIG. 5 taken from detail 6 of FIG. 5.
Figure 7:
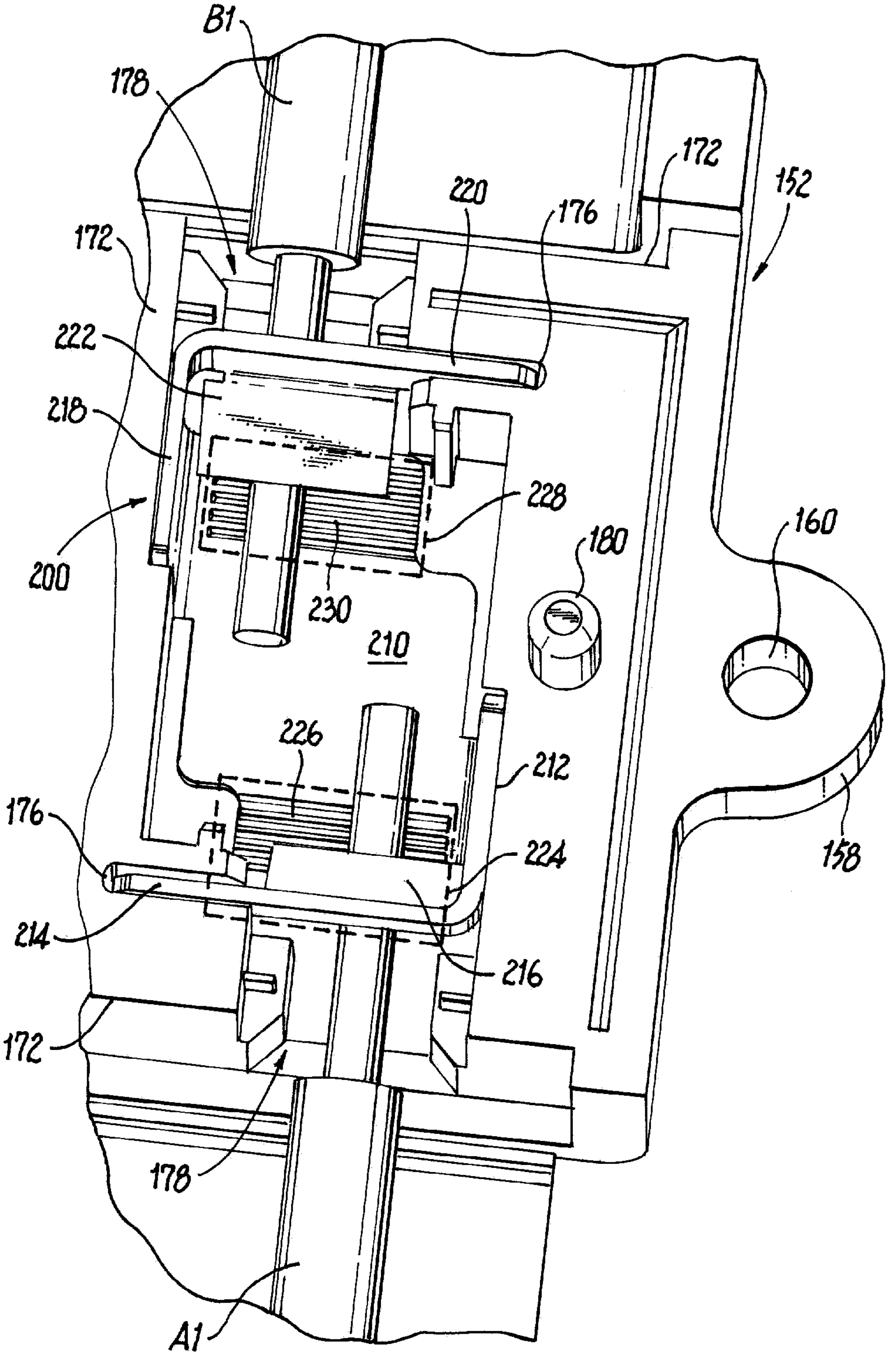
FIG. 7 is an enlarged top plan view of a portion of the cover of FIG. 4 taken from detail 7 of FIG. 4, and illustrating the contact chamber of the cover holding the electrical contact which is electrically connecting two electrical conductors.
Figure 8:
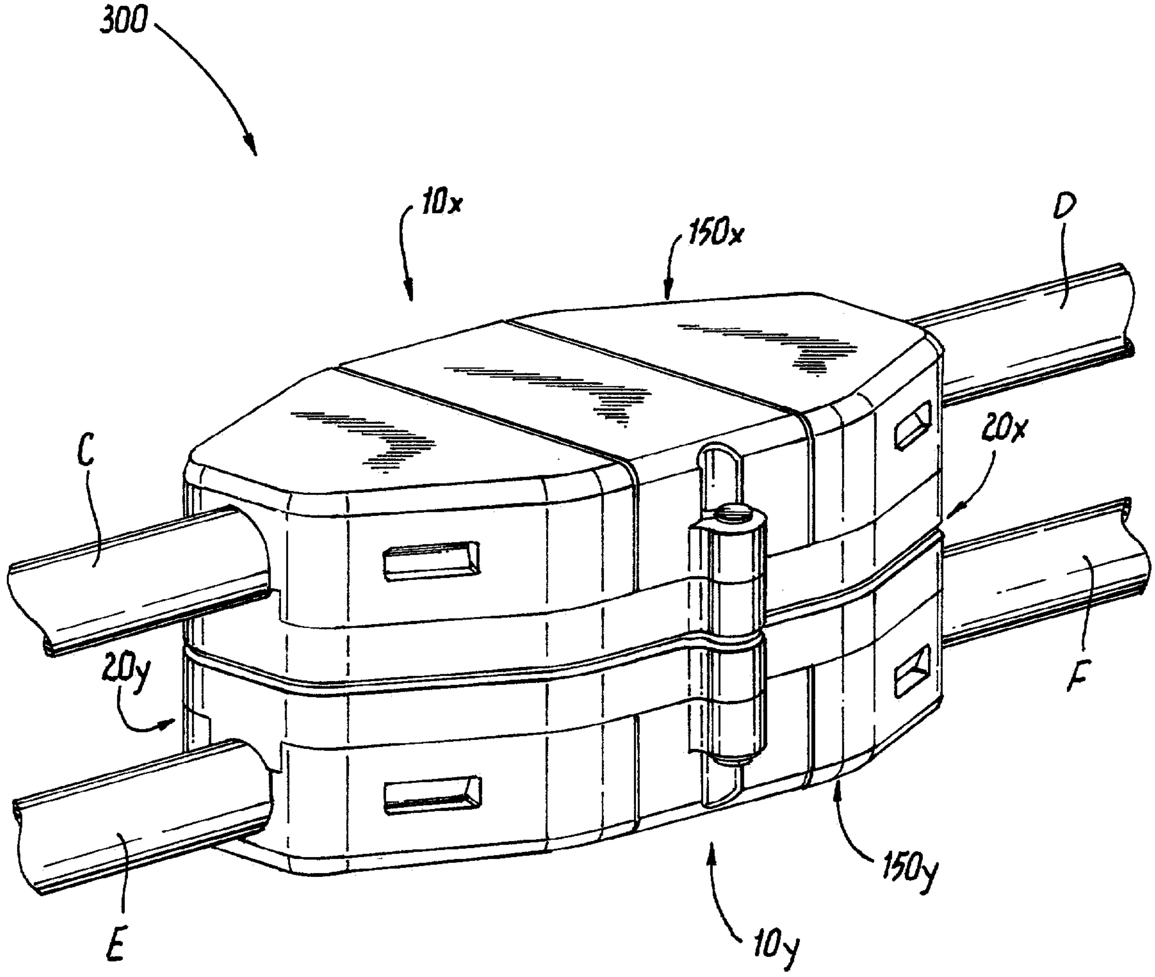
FIG. 8 is a perspective view of an exemplary embodiment of a wire connector assembly according to the present disclosure, illustrating two of the wire connectors of FIG. 1 coupled together.

Referring now to FIGS. 6 and 7, an exemplary embodiment of an electrical contact 200 is shown. For ease of description, the electrical contact 200 may be divided into a first contact portion 202 and a second contact portion 204 that are interconnected such that an electrical path is formed between the first contact portion 202 and a second contact portion 204. In the embodiment shown, the first contact portion 204 includes a portion of a contact plate 210, a first stabilizing arm 212, a first mounting arm 214 and a first contact arm 216. Similarly, the second contact portion 204 includes a portion of a contact plate 210, a second stabilizing arm 218, a second mounting arm 220 and a second contact arm 222. In the embodiment shown, the contact plate 210 is substantially planar plate where the first and second contact portions 202 and 204 are formed as a unitary or monolithic structure, and a portion of the contact plate 210 provides the electrical path between the first contact portion 202 and the second contact portion 204. However, the present disclosure also contemplates that the first and second contact portions 202 and 204 may be formed as separate, spaced apart structures where the contact plates are electrically connected.

The portion of the contact plate 210 within the first contact portion 202 includes a contact area 224. The contact area 224 may include one or more contact enhancing surfaces 226 configured to increase the frictional force between the contact plate 210 and bare low voltage or high voltage electrical conductors positioned between the contact plate 210 and the first contact arm 216. The contact enhancing surfaces 226 may be in the form of knurling, teeth or other surfaces capable of increasing the frictional force between the contact plate 210 and the electrical conductors. Non-limiting examples of other surfaces capable of increasing the frictional force include bumpy, coarse and/or gnarled surfaces. Similarly, the portion of the contact plate 210 within the second contact portion 204 includes a contact area 228. The contact area 228 may include one or more contact enhancing surfaces 230 configured to increase the frictional force between the contact plate 210 and bare low voltage or high voltage electrical conductors, positioned between the contact plate 210 and the second contact arm 222. The contact enhancing surfaces 230 may be in the form of knurling, teeth or other surfaces capable of increasing the frictional force between the contact plate 210 and the electrical conductors. Non-limiting examples of other surfaces capable of increasing the frictional force include bumpy, coarse and/or gnarled surfaces.

Continuing to refer to FIGS. 6 and 7, the first stabilizing arm 212 includes a first end 212*a* extending from a first side 210*a* of the contact plate 210 and is substantially perpendicular to the contact plate 210. However, the first stabilizing arm 212 may be at an angle relative to the contact plate 210. A first mounting arm 214 is at or near a second end 212*b* of the first stabilizing arm 212 and extends from a side of the first stabilizing arm 212 such that the first mounting arm 214 is substantially perpendicular to the first stabilizing arm 212. However, first mounting arm 214 may be at an angle relative to the first stabilizing arm 212. The first contact arm 216 extends from the first mounting arm 214 towards the contact plate 210. The first contact arm 216 is configured such that the first contact arm 216 is able to flex, e.g., bend, when a conductor is inserted between the contact plate 210 and the first contact arm 216 permitting forward advancement of the conductor between the contact plate 210 and the first contact arm 216 while limiting or preventing withdrawal of the conductor from between the contact plate 210 and the first contact arm 216. When a conductor is inserted between the contact plate 210 and the first contact arm 216, the first contact arm 216 cooperates with the contact enhancing surface 226 to secure the conductor to the first contact portion 202 of the electrical contact 200.

Continuing to refer to FIGS. 6 and 7, the second stabilizing arm 218 includes a first end 218*a* extending from a second side 210*b* of the contact plate 210 and is substantially perpendicular to the contact plate 210. However, the second stabilizing arm 218 may be at an angle relative to the contact plate 210. A second mounting arm 220 is at or near a second end 218*b* of the second stabilizing arm 218 and extends from a side of the second stabilizing arm 218 such that the second mounting arm 220 is substantially perpendicular to the second stabilizing arm 218. However, second mounting arm 220 may be at an angle relative to the second stabilizing arm 218. The second contact arm 222 extends from the second mounting arm 220 towards the contact plate 210. The second contact arm 222 is configured such that the second contact arm 220 is able to flex, e.g., bend, when a conductor is inserted between the contact plate 210 and the second contact arm 222 permitting forward advancement of the conductor between the contact plate 210 and the second contact arm 222 while limiting or preventing withdrawal of the conductor from between the contact plate 210 and the second contact arm 222. When a conductor is inserted between the contact plate 210 and the second contact arm 222, the second contact arm 222 cooperates with the contact enhancing surface 230 to secure the conductor to the second contact portion 204 of the electrical contact 200.

As illustrated in FIGS. 5 and 7, the electrical contacts 200 are fitted into the contact chamber 170. Grooves in the walls 172 of the contact chamber 170 forming the contact mounting structure 176 are configured to receive the first mounting arm 214 and the second mounting arm 220. Also shown in FIG. 7 is an example of two electrical conductors A1 and B1, e.g., two line voltage conductors or two low voltage conductors, connected to the electrical contact 170. As shown in FIG. 7, electrical conductor A1 is clamped between the first contact arm 216 and the contact enhancing surface 226 of the contact area 224 of the contact plate 210. Friction from the contact enhancing surface 226 and the force applied by the first contact arm 216 against the electrical conductor A1 causes the electrical conductor A1 to be attached to the electrical contact 200. Similarly, as shown in FIG. 7, electrical conductor B1 is clamped between the second contact arm 222 and the contact enhancing surface 230 of the contact area 228 of the contact plate 210. Friction from the contact enhancing surface 230 and the force applied by the second contact arm 222 against the electrical conductor B1 causes the electrical conductor B1 to be attached to the electrical contact 200. As a result, an electrical connection between the conductors A1 and B1 is established.

To permanently or releasably secure the cover 150 to the base 20, the main cover member 152 is first aligned with the base 20, seen in FIG. 4, such that alignment pins 180 extending from one or more walls of the contact chambers 170, seen in FIG. 5, fit within the alignment apertures 28 in the body 22, seen in FIGS. 3 and 4. With the cover 150 properly aligned with the base 20, the cover 150 is then permanently or releasably secured to the base 20. To permanently secure the cover 150 to the base 20, a mounting fastener (not shown), e.g., a rivet, can be passed through the aperture 32 in the mounting tab 30 of the body 22 and through the aperture 160 in the mounting tabs 158 on the main cover member 152. The cover 150 may also be permanently secured to the base 20 using, for example, welds, such as ultrasonic welds. To releasably secure the cover 150 to base 20, a mounting fastener (not shown), e.g., a nut and bolt, where the bolt can be passed through the aperture 32 in the mounting tab 30 of the body 22 and through the aperture 160 in the mounting tabs 158 on the main cover member 152 and the nut can be secured to the bolt.

Referring again to FIGS. 2, 3 and 5, as described above, the two movable cover members 154 and 156 are pivotably joined to the main cover member 152 using a living or integral hinge structure. The movable cover member 154 is configured and dimensioned to align with the first end portion 22*c* of the body 20, and the movable cover member 156 is configured and dimensioned to align with the second end portion 22*d* of the body 20. To releasably secure the movable cover member 154 to the body 22 of the base 20 and the movable cover member 156 to the body 22 of the base 20, one or more cover coupling assemblies 50 may be used. In the embodiment shown in FIG. 2A, the one or more cover coupling assemblies 50 are snap fit joints. In this embodiment, two coupling assemblies 50 are used to releasably secure the movable cover member 154 to the body 22, and two coupling assemblies 50 are used to releasably secure the movable cover member 156 to the body 22. Each coupling member assembly 50 may include a cantilever beam 252 and a matching recess or opening 254. The cantilever beam 252 extends from the body 22 of the base 20, as shown in FIGS. 2 and 2A, and has a free end 252*a*. The cantilever beam 252 includes a tapered hook 256 at its free end 252*a*. The matching recesses or openings 254 are located in the movable cover member 154 and the movable cover member 156. The matching recesses 254 are positioned on the movable cover member 154 to align with the tapered hook 256 of the cantilever beam 252 when the movable cover member 154 is in a closed position, shown in FIG. 1. Similarly, the matching recesses 254 are positioned on the movable cover member 156 to align with the tapered hook 256 of the cantilever beam 252 when the movable cover member 156 is in a closed position, shown in FIG. 1.

Referring now to FIGS. 8-12, the two wire connectors 10 may be coupled together to form a wire connector assembly 300. In the embodiment shown, each wire connector is substantially the same as the wire connectors 10 described above such that a detailed description of the wire connectors is not repeated. However, to distinguish between the two wire connectors in this exemplary embodiment, each wire connector is referenced with an alphanumeric identifier, such that a first of the two wire connectors is referenced as 10*x* and a second of the two wire connectors is referenced as 10*y*. In addition, certain components of the wire connectors 10*x* and 10*y* will follow the same alphanumeric identification, such that, for example, the base of wire connector 10*x* is referenced as base 20*x* and the cover of wire connector 10*x* is referenced as cover 150*x*, and the base of wire connector 10*y* is referenced as base 20*y* and the cover of wire connector 10*y* is referenced as cover 150*y*. Components of the bases 20*x* and 20*y* may have their original alphanumeric references, and components of the covers 150*x* and 150*y* may have their original alphanumeric references.

In the exemplary embodiment of FIGS. 8-12, the wire connector 10*x* receives and splices electrical conductors in line voltage cables C and D, and the wire connector 10*y* receives and splices electrical conductors in low voltage cables E and F. Each cable C and D may include a double insulated set of electrical conductors rated for line voltages, and each cable E and F may include a double insulated set of electrical conductors rated for low voltages. The line voltage cables C and D may be used to provide electrical power. The cable C includes a set of line voltage conductors C1, C2, C3 that are individually insulated by a first insulating sleeve or jacket with a second insulating sleeve or jacket surrounding the set. Similarly, the cable D includes a set of line voltage conductors D1, D2, D3 that are individually insulated by a first insulating sleeve or jacket with a second insulating sleeve or jacket surrounding the set. The low voltage cables E and F may be used for control/signaling purposes. The cable E includes a set of low voltage conductors E1, E2, E3 that are individually insulated by a first insulating sleeve or jacket with a second insulating sleeve or jacket surrounding the set. Similarly, the cable F includes a set of low voltage conductors F1, F2, F3 that are individually insulated by a first insulating sleeve or jacket with a second insulating sleeve or jacket surrounding the set. It should also be noted that, while the embodiment shown presents the cables C and D as having line voltage conductors and the cables E and F as having low voltage conductors, one skilled in the art would recognize that any of the cables C, D, E, F can include either low voltage conductors or line voltage conductors.

Figure 9:
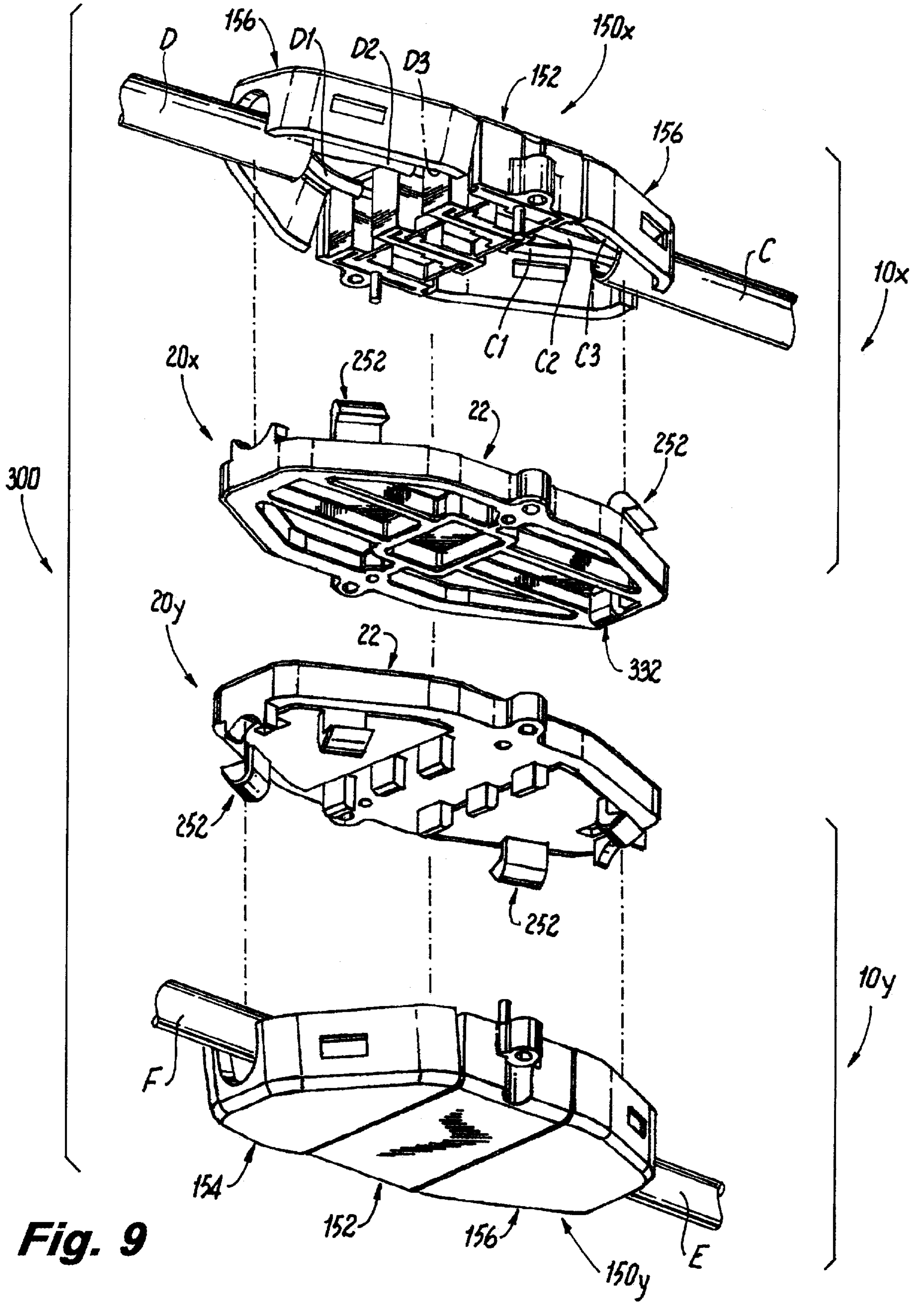
FIG. 9 is an exploded perspective view of the wire connector assembly of FIG. 8, illustrating cables and components of the two wire connectors including covers, bases and electrical contacts.
Figure 10:
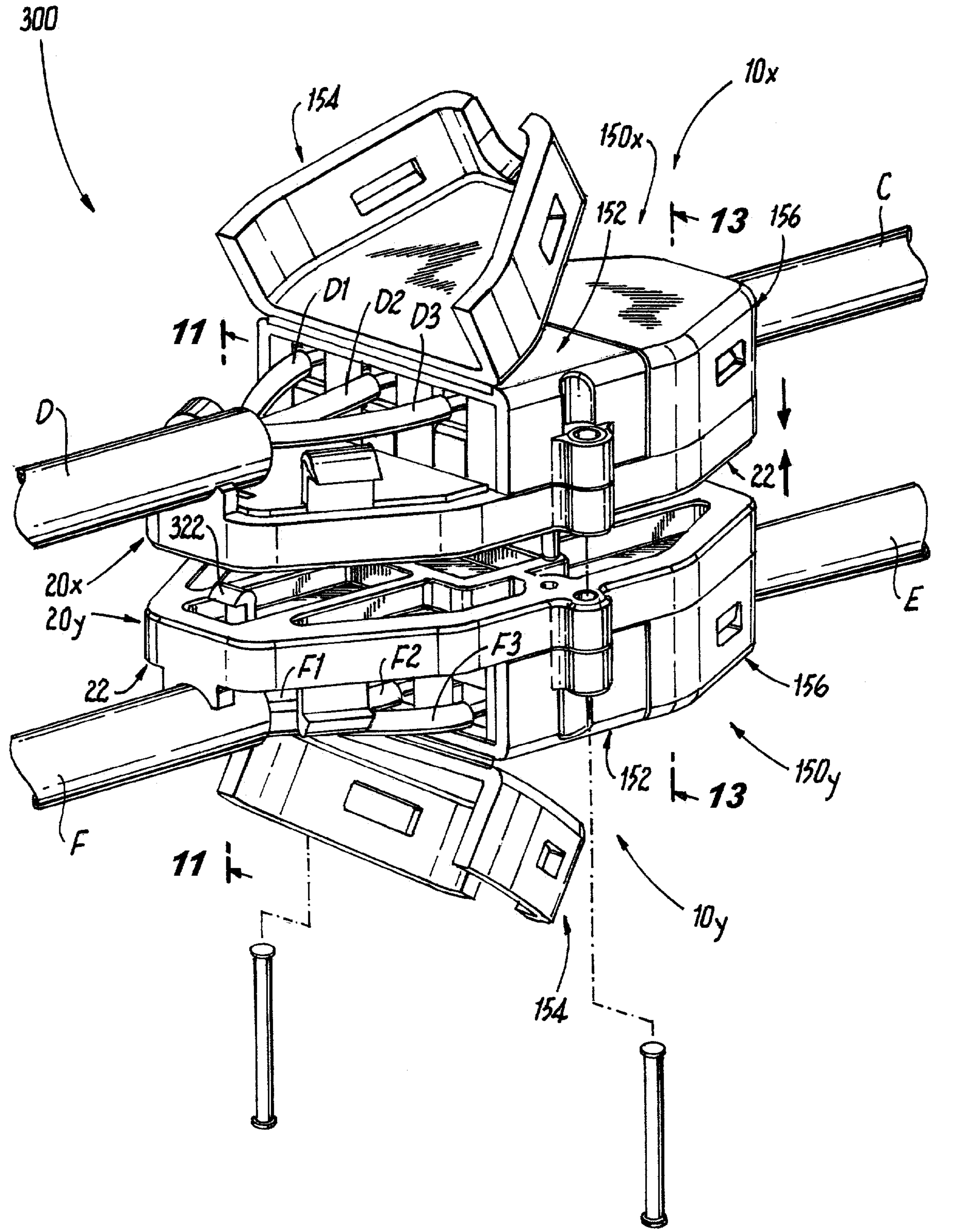
FIG. 10 is a perspective view of the wire connector assembly FIG. 9, illustrating the two wire connectors just prior to coupling.
Figure 11:
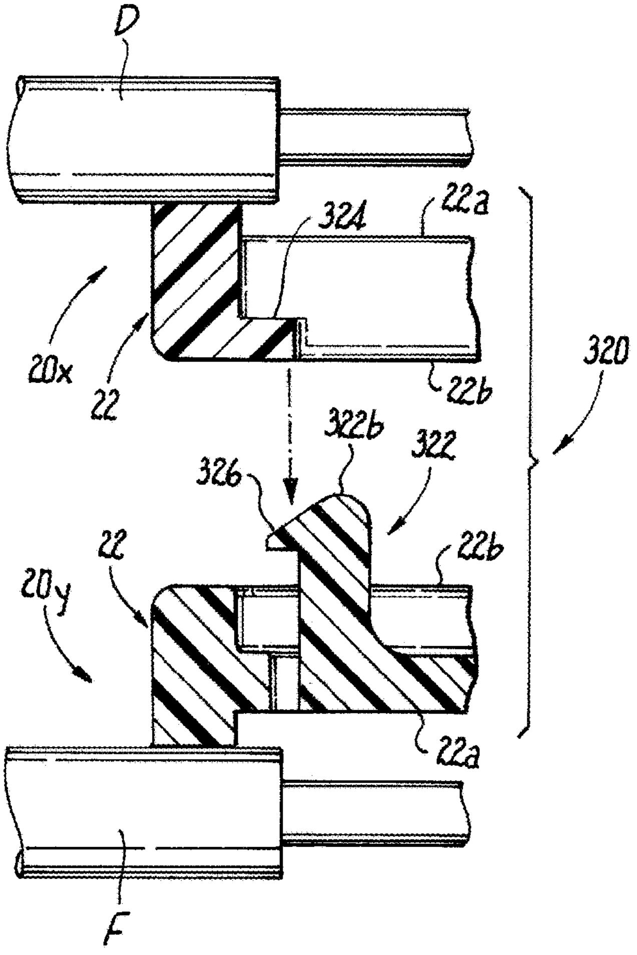
FIG. 11 is a cross-sectional view of the wire connector assembly of FIG. 10 taken from detail 11 of FIG. 10, and illustrating an exemplary embodiment of the two bases positioned to be coupled to each other.
Figure 12:
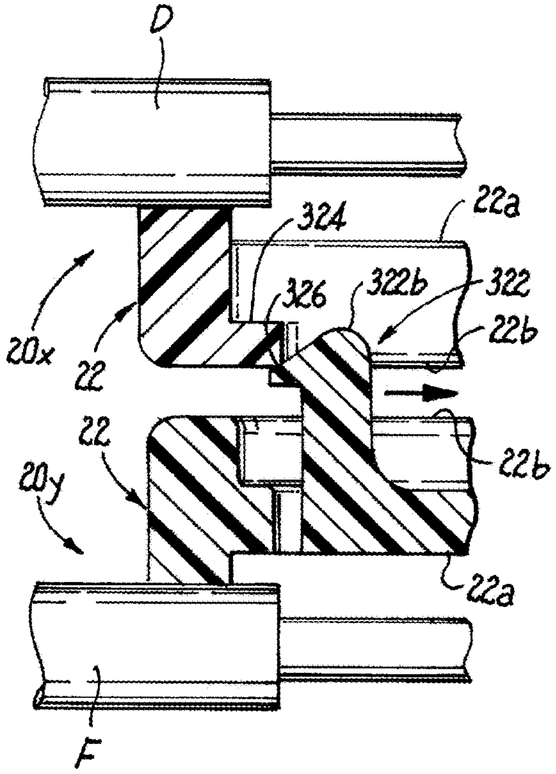
FIG. 12 is a cross-sectional view of the wire connector assembly of FIG. 11, illustrating the two bases just prior to being coupled to each other.
Figure 13:
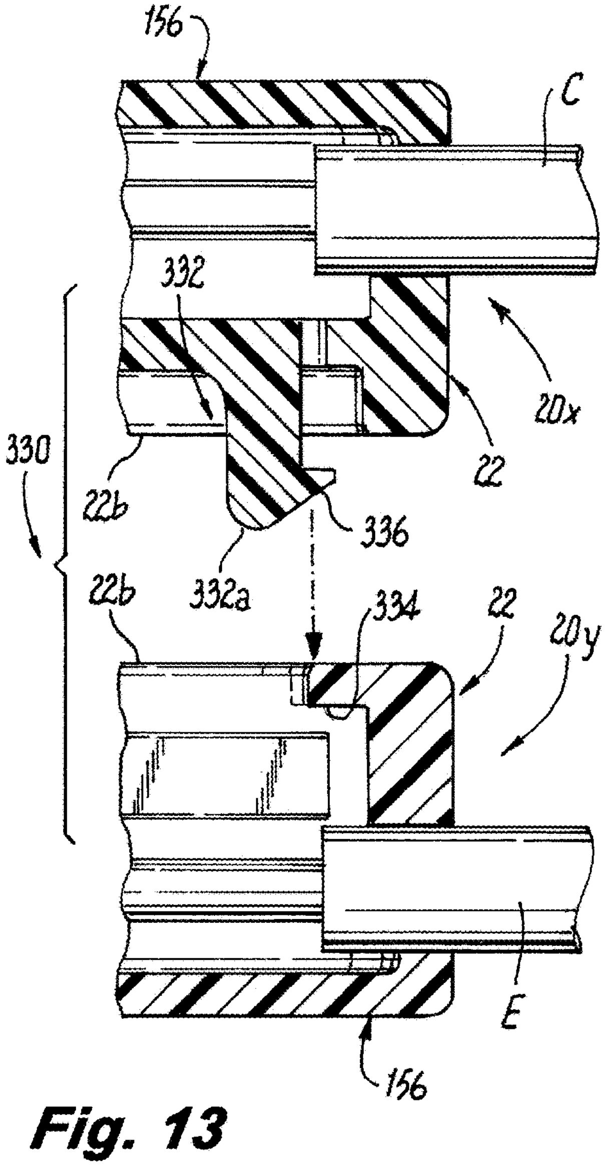
FIG. 13 is a cross-sectional view of the wire connector assembly of FIG. 10 taken from detail 13 of FIG. 10, and illustrating an exemplary embodiment of the two bases positioned to be coupled to each other.
Figure 14:
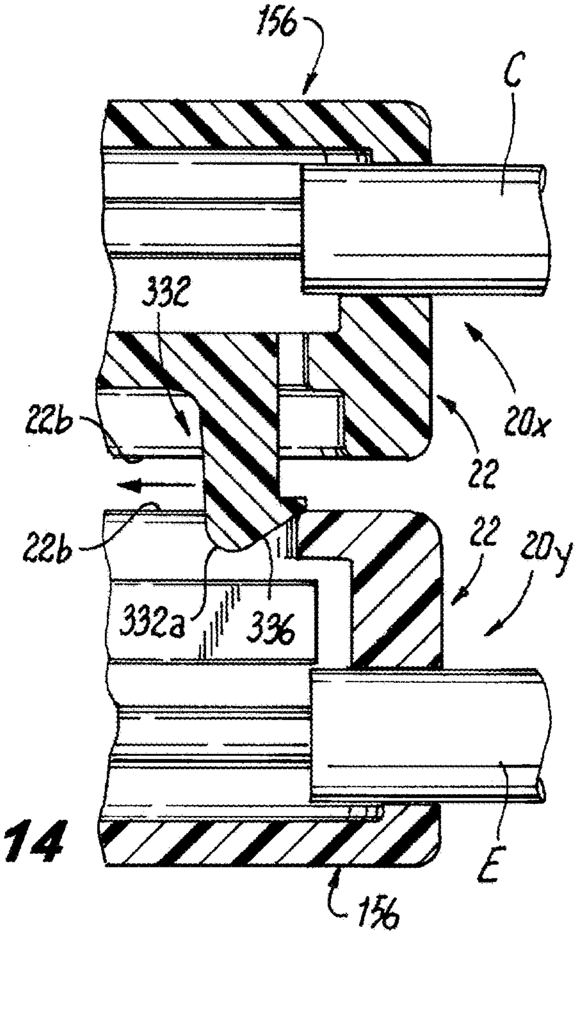
FIG. 14 is a cross-sectional view of the wire connector assembly of FIG. 11, illustrating the two bases just prior to being coupled to each other.

As shown in FIGS. 9-14, to secure the wire connector 10*x* to the wire connector 10*y* one or more base coupling assemblies, e.g., 320 and/or 330 may be used. In the exemplary embodiment shown, the one or more base coupling assemblies 320 are snap fit joints. However, the present disclosure contemplates other fasteners to secure the wire connector 10*x* to the wire connector 10*y*. Non-limiting examples include nuts and bolts, and welds, such as ultrasonic welds. In the embodiment shown, base coupling assemblies 320 and 330 are snap fit joints that are used to secure wire connectors 10*x* and 10*y* together. The base coupling assembly 320 includes a cantilever beam 322 and a matching lip 324. In the embodiment shown, the cantilever beam 322 extends from the upper wall 22*a* of the body 22 of the base 20*y* in a direction away from the cover 150*y*, as shown in FIGS. 10 and 11. The cantilever beam 322 has a free end 322*a* that includes a tapered hook 326. The matching lip 324 for the cantilever beam 322 is located in the lower wall 22*b* of the body 20*x* of the first wire connector 10*x*. The matching lip 324 is positioned on the lower wall 22*b* of the body 20*x* to align with the tapered hook 326 of the cantilever beam 322 when the base 20*x* of the first wire connector 10*x* is positioned to be coupled to the base 20*y* of the second wire connector 10*y*, as shown in FIGS. 11 and 12. Base coupling assembly 330 includes a cantilever beam 332 and a matching lip 334, seen in FIGS. 13 and 14. In the embodiment shown, the cantilever beam 332 extends from the upper wall 22*a* of the body 22 of the base 20*x* in a direction away from the cover 150*x*, as shown in FIGS. 13 and 14. The cantilever beam 332 has a free end 332*a* that includes a tapered hook 336 at its free end 332*a*. The matching lip 334 for the cantilever beam 332 is located in the lower wall 22*b* of the body 22 of the base 20*y*. The matching lip 334 is positioned on the lower wall 22*b* of the body 22 of the base 20*y* to align with the tapered hook 336 of the cantilever beam 332 when the base 20*x* of the first wire connector 10*x* is positioned to be coupled to the base 20*y* of the second wire connector 10*y*, as shown in FIGS. 13 and 14.

When coupling the first wire connector 10*x* to the second wire connector 10*y*, the base 20*x* of the first wire connector 10*x* is positioned adjacent the base 20*y* of the second wire connector 10*y* as shown in FIGS. 9 and 10 so that their respective cantilever beam 322 and 332 are aligned with their corresponding matching lips 324 and 334. The base 20*x* of the first wire connector 10*x* is then pressed against the base 20*y* of the second wire connector 10*y* so that the base coupling assemblies 320 and 330 couple the bases 20*x* and 20*y* together.

Figure 15:
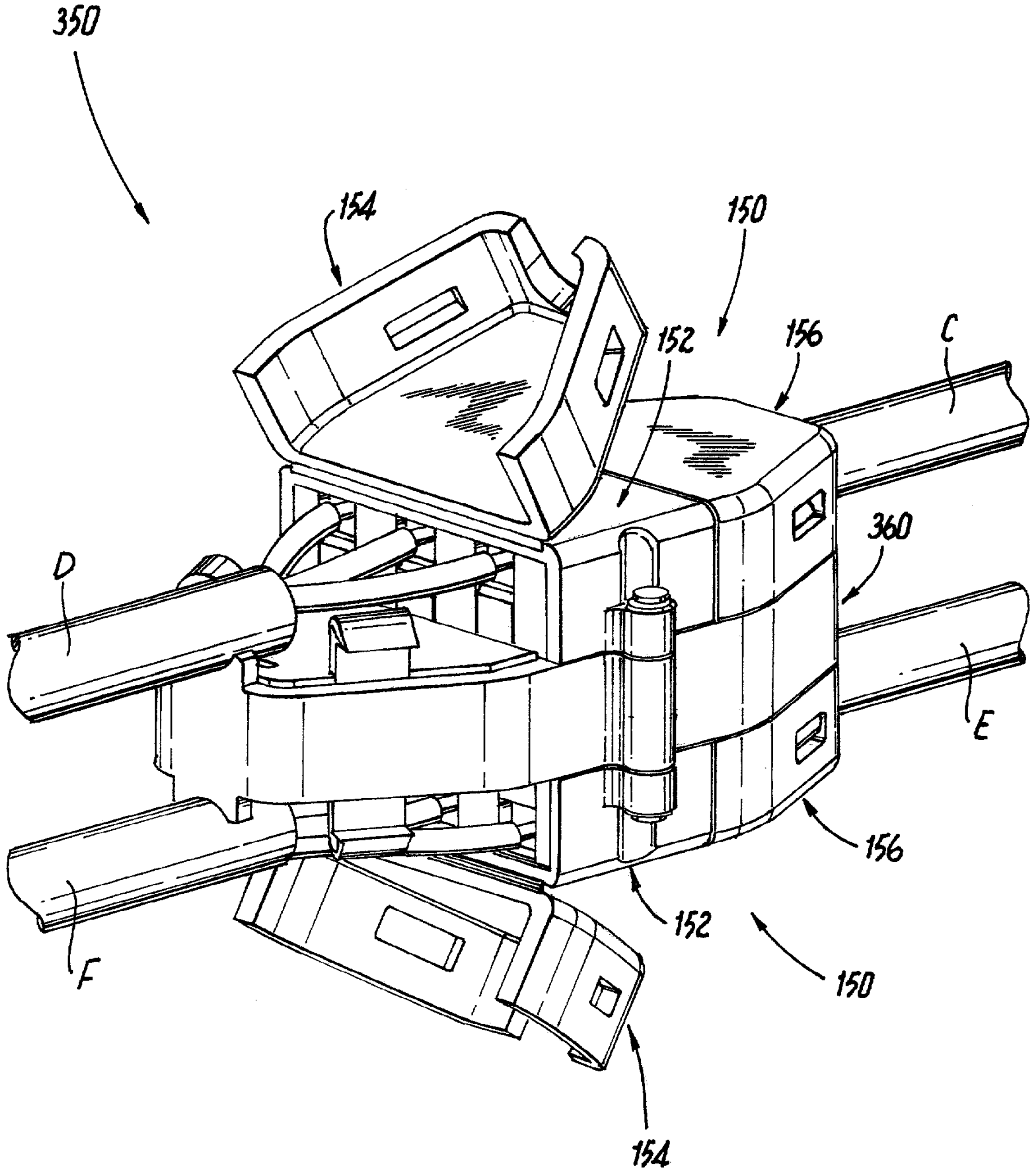
FIG. 15 is a perspective view of another exemplary embodiment of a low-profile wire connector assembly according to the present disclosure.
Figure 16:
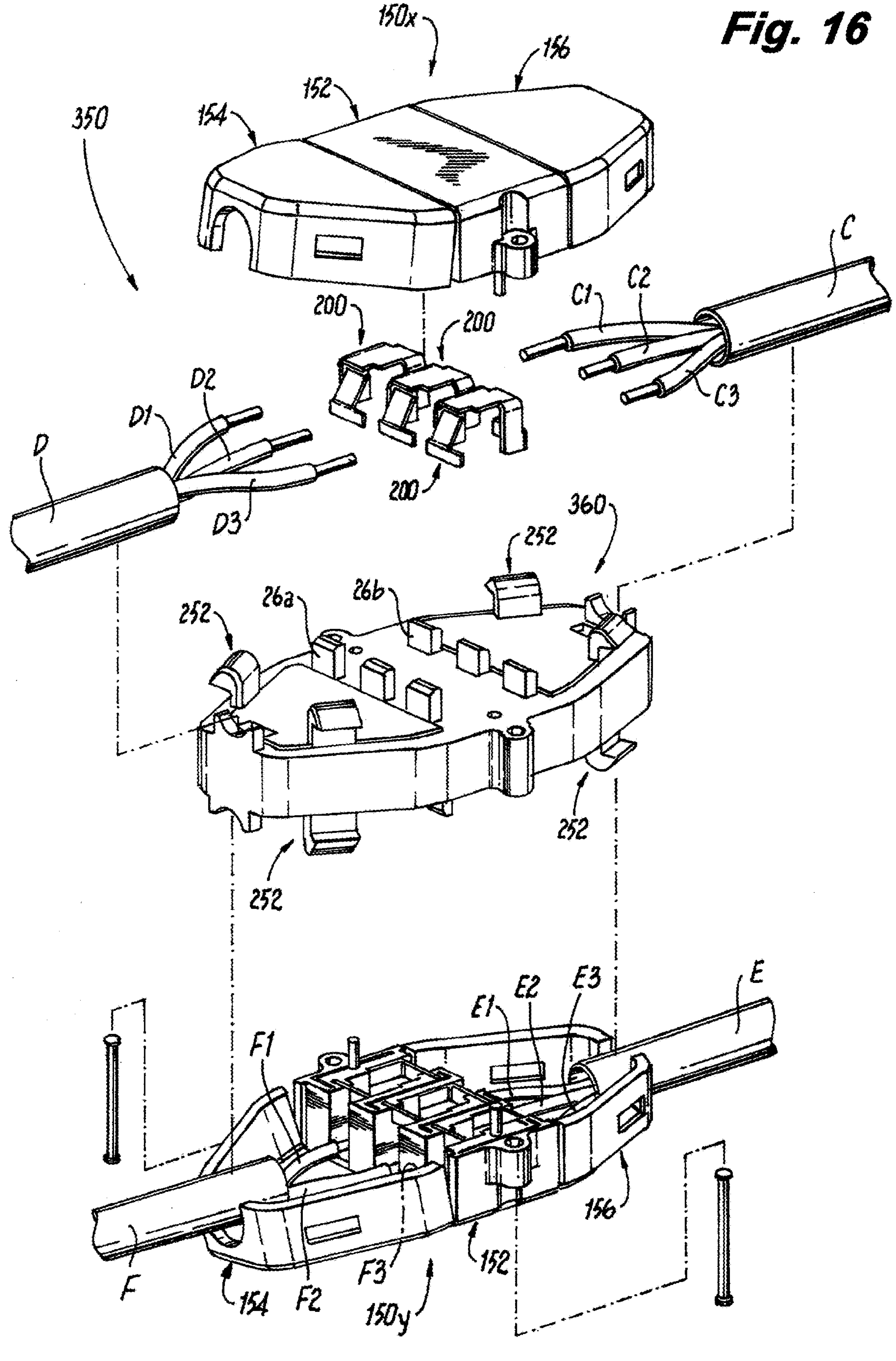
FIG. 16 is an exploded perspective view of the low-profile wire connector of FIG. 15, illustrating cables and components of the low-profile wire connector including multiple covers and a common base.

Referring now to FIGS. 15 and 16, another exemplary embodiment of a low-profile wire connector assembly 350 according to the present disclosure is shown. In this exemplary embodiment, the wire connector assembly 350 is substantially the same as the wire connector assembly 300 described above, except that the first base 20*x* and the second base 20*y* are replaced by a single base 360. The base 360 is substantially similar to the combination of bases 20*x* and 20*y* with the exception that there is a single body 362 and there are no base coupling assemblies 320 and 330. In this embodiment, the thickness of the body 362 is preferably sufficient to provide a minimum 0.25 inch physical separation between the line voltage conductors in cables C and D and the low voltage conductors in cables E and F.

Referring now to FIGS. 17-28, an exemplary embodiment of a low-profile wire connector according to the present disclosure is shown. To help distinguish between this embodiment of the wire connector and the aforementioned embodiments of the wire connector, this disclosure will continue the practice of referencing different embodiments hereinafter with an alphanumeric identifier. In addition, just as certain components followed the same alphanumeric identification, e.g., the base of wire connector 10*x* is referenced as base 20*x* and the cover of wire connector 10*x* is referenced as cover 150*x*, the ensuing reference to different embodiments disclosed will continue this practice.

Figure 17:
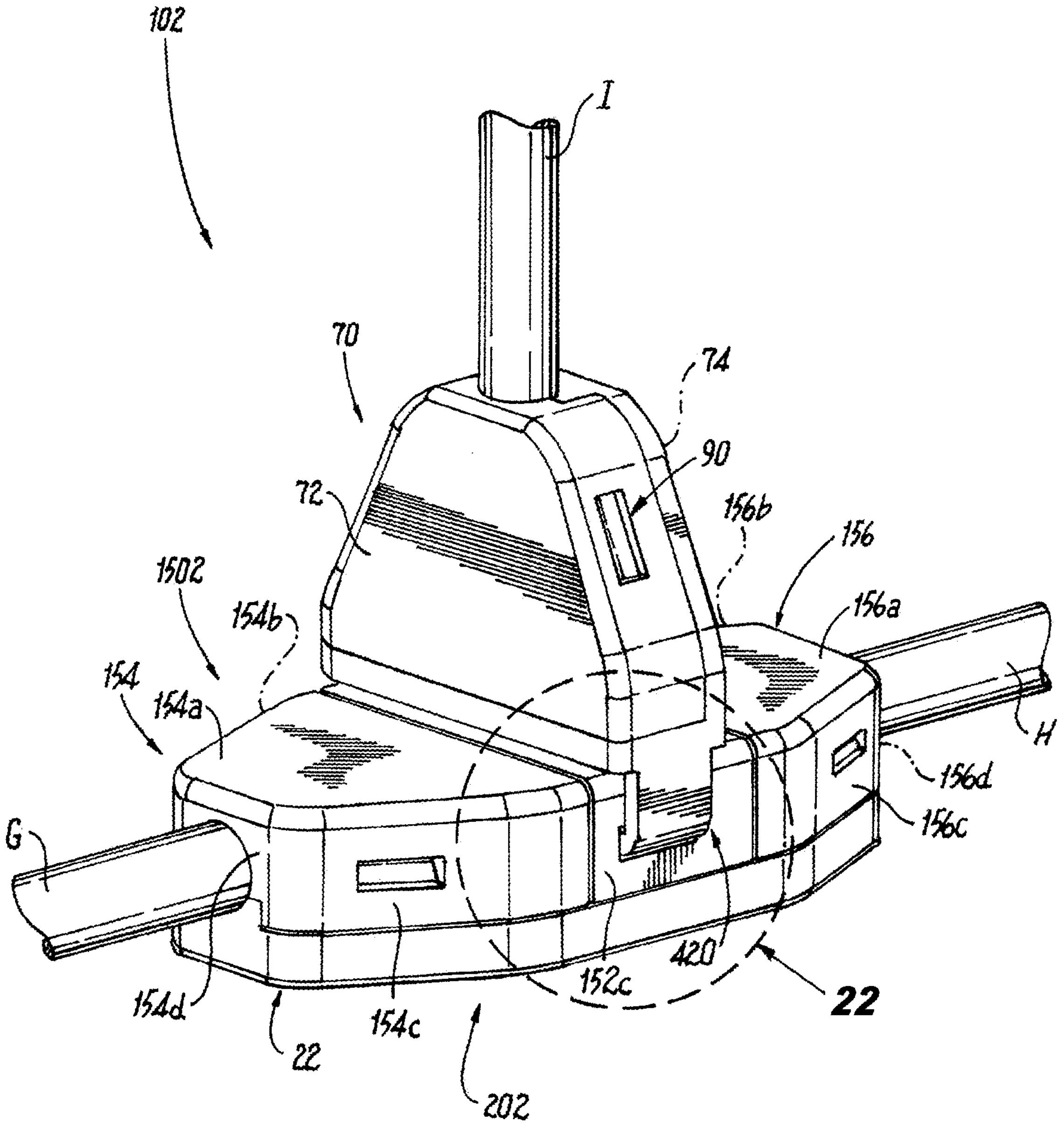
FIG. 17 is a perspective view of an exemplary embodiment of a low-profile wire connector according to the present disclosure.

In this exemplary embodiment, portions of the wire connector 10*z*, e.g., cover 150*z* and base 20*z* are substantially similar to the cover 150 and base 20, respectively, of the wire connector 10 described above with respect to FIGS. 1-7. However, according to the present embodiment, the cover 150*z* and base 20*z* are configured for attaching a supplemental wire connector 70 that allows for an additional third cable, cable I, to connect to or splice to the two cables G and H. That is, as illustrated in FIG. 17, the wire connector 10*z* connects or splices cables G, H, and I to each other. The electrical cables G, H, and I may include a set of electrical conductors rated for line voltages that supply electrical power, or the electrical cables G, H, and I may include a set of electrical conductors rated for low voltages to provide control signals. As a non-limiting example, the line voltage conductors may be 10 AWG to 14 AWG conductors, and the low voltage conductors may be 18 AWG to 24 AWG conductors. In the exemplary embodiment shown, the cable G includes a set of electrical conductors G1, G2, G3 that are individually insulated by a first insulating sleeve or jacket with a second insulating sleeve or jacket surrounding the set. Similarly, cable H includes a set of electrical conductors H1, H2, H3 that are individually insulated by a first insulating sleeve or jacket with a second insulating sleeve or jacket surrounding the set. Furthermore, cable I includes a set of electrical conductors I1, I2, I3 that are individually insulated by a first insulating sleeve or jacket with a second insulating sleeve or jacket surrounding the set.

Continuing to refer to FIGS. 17-28, the wire connector 10*z* includes a base 20*z*, a cover 150*z*, and may include a supplemental wire connector 70. The base 20*z*, cover 150*z*, and supplemental wire connector 70 are made of an electrical insulating material. As a non-limiting example, the insulating material for the base 20*z*, cover 150*z*, and supplemental wire connector 70 may have an insulation factor that is the same insulation factor as the insulation jackets of the line voltage conductors. In addition to or another non-limiting example, is that the base 20*z*, cover 150*z*, and supplemental wire connector 70 may be dimensioned to provide a minimum 0.25 of an inch physical separation between the low voltage conductors and the line voltage conductors when a first wire connector splicing low voltage conductors is coupled to a second wire connector splicing line voltage conductors. The wire connectors 10*z* may also include one or more cover coupling assemblies 50, similar to that described above with respect to FIG. 2A. Although not shown, wire connectors 10*z* may include one or more base coupling assemblies, e.g., base coupling assemblies 320 and 330, similar to that described above with respect to FIGS. 11-14, and/or one or more base coupling assemblies, e.g., 520, that will be described in more detail below. The supplemental wire connector 70 may include one or more supplemental wire connector coupling assemblies, e.g., 420, shown in FIGS. 17 and 18 (only one side shown), and one or more supplemental wire connector cover coupling assemblies 90, seen in FIG. 18. Each of the one or more cover coupling assemblies 50 is used to releasably or permanently secure a portion of the cover 150*z* to the base 20*z* in a manner that is substantially the same as described above with respect to previous embodiments. Each of the one or more base coupling assemblies, e.g., base coupling assemblies 320 and 330 and/or base coupling assemblies 520, may be used to releasably or permanently secure a base 20*z* of one wire connector 10*z* to a base 20*z* of another wire connector 10*z* in a manner that is substantially the same as described above with respect to previously described embodiments. Each of the one or more supplemental wire connector coupling assemblies, e.g., 420 is used to releasably or permanently secure a supplemental wire connector 70 to a cover 150*z* of a wire connector 10*z* as described in more detail below. Each of the one or more supplemental wire connector cover coupling assemblies 90 is used to releasably or permanently secure a portion of the cover 72 to the base 74 of supplemental wire connector 70 as described in more detail below.

Referring to FIGS. 17-28, the base 20*z* is substantially similar to the above-described embodiments and for reasons of brevity will not be described in detail.

Figure 18:
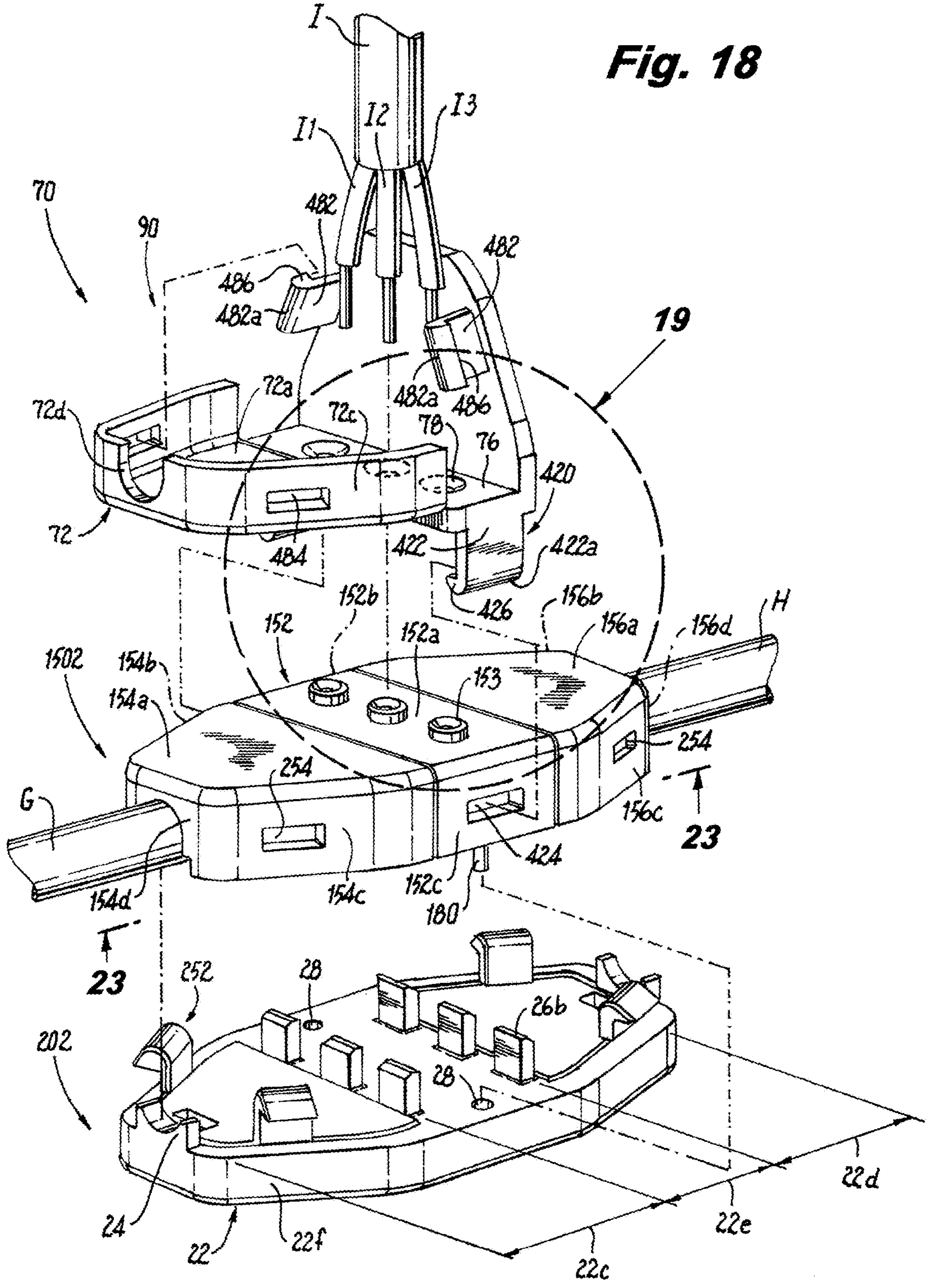
FIG. 18 is an exploded top perspective view of the wire connector of FIG. 17, illustrating components of the low-profile wire connector including a supplemental wire connector, a cover, and a base.

Turning now specifically to FIGS. 18-21, in this exemplary embodiment, the cover 150*z* is substantially similar to cover 150 described with respect to previous embodiments, except that the main cover member 152 may have at least one aperture 153 for providing access to the electrical contact 300 therebelow for receiving a conductor which, depending on a particular embodiment, may be a wire, a blade-type connector, and/or pin type connector. extending from supplemental wire connector 70. Similarly, to the previously described covers, the main cover 150*z* includes a main cover member 152 and one or more movable cover members that are movably connected to the main cover member 152. In the embodiment shown, the cover 150*z* includes two movable cover members 154 and 156 that are pivotably joined to the main cover member 152 using a living or integral hinge structure to form a unitary or monolithically structured cover 150*z*. As such, the movable cover members 154 and 156 are capable of moving between an open position, not shown, and a closed position as depicted in FIGS. 17 and 18. As shown in FIG. 18, the movable cover member 154 is configured and dimensioned to align with the first end portion 22*c* of the body 20*z*, movable cover member 156 is configured and dimensioned to align with the second end portion 22*d* of the body 20*z*, and the main cover member 152 is configured and dimensioned to align with the central portion 22*e* of the body 20*z*.

Figure 22:
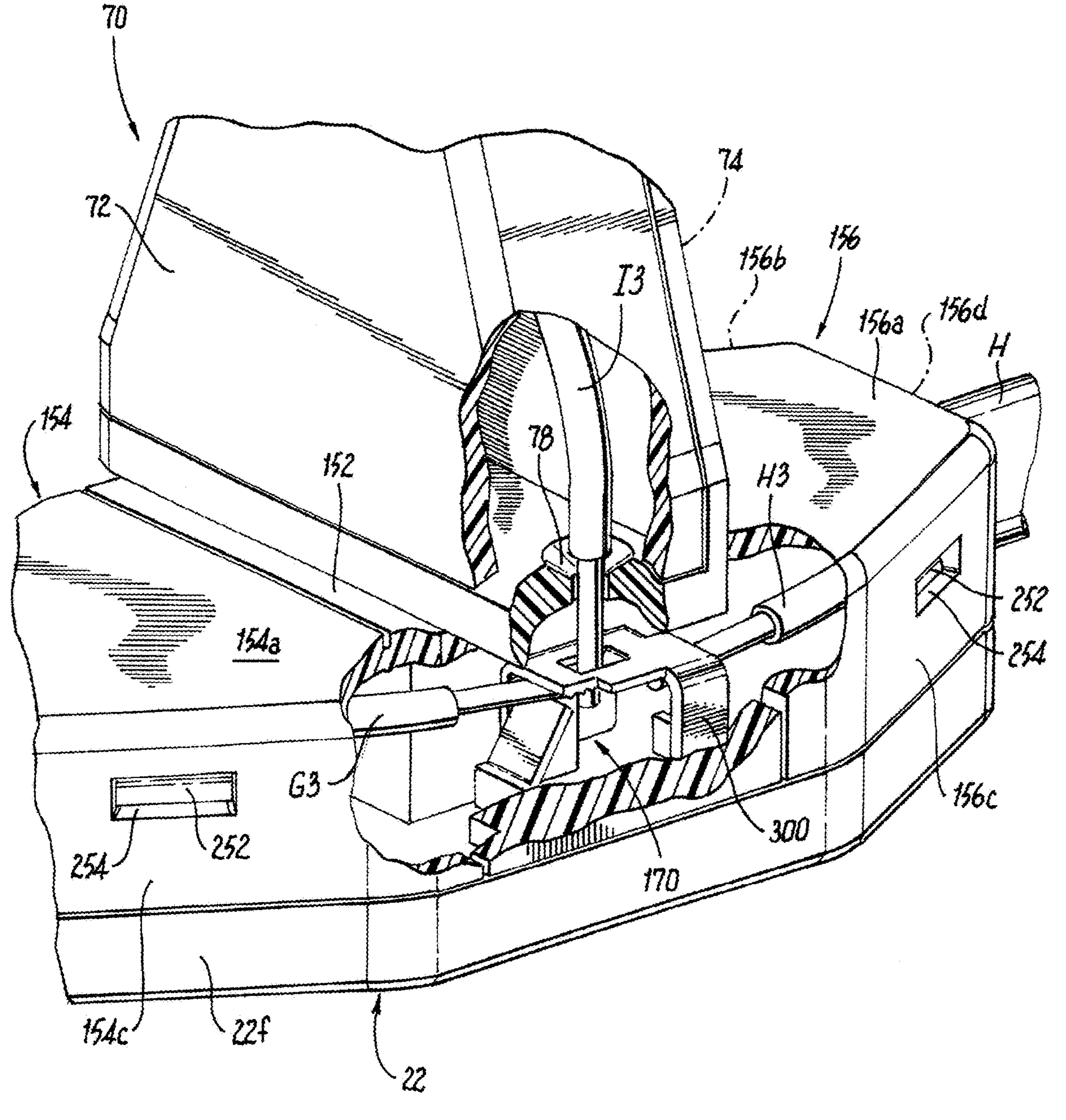
FIG. 22 is a cross-sectional view of the wire connector of FIG. 17 taken from detail 22 of FIG. 17, and illustrating a contact chamber of the cover holding an electrical contact which is electrically connecting three conductors.

The main cover member 152 includes an upper wall 152*a*, a first side wall 152*b* having one end extending from one end of the upper wall 152*a* and a second side wall 152*c* having one end extending from another end of the upper wall 152*a* so that the upper wall 152*a* and the side walls 152*b* and 152*c* form a U-shaped structure with a hollow interior. The upper wall 152*a* may also have at least one aperture 153 for providing access to the electrical contact 300 therebelow (e.g., see FIG. 22). The embodiment illustrated in FIGS. 18 and 19 has three apertures 153. Depending on a particular embodiment, the apertures 153 could be wire receiving holes to accommodate conductor wires. For example, as shown in FIG. 22, the stripped end I of conductor I3 extends directly from supplemental wire connector 70 through the main cover member 152 and is received in connector 300 in the unit below. According to other illustrative embodiments to be described below, blade receiving slots to accommodate a blade-type conductor or pin receiving holes to accommodate a pin-type conductor extending from supplemental wire connector 70 may be provided. Preferably, a way is provided for covering any unused apertures 153. For example, knockouts 153*a*, seen in FIG. 20, and/or plugs 153*b*, seen in FIG. 21, may be used to cover the apertures 153 to prevent debris from entering the contact chamber 170 and disrupting electrical conduction. The knockouts 153*a* may be selectively "knocked out" if there is a need for an additional cable. Similarly, the plug 153*b* may be selectively removed if there is a need for an additional cable. The connection of a conductor with an electrical contact 300 through the at least one aperture 153 will be discussed in greater detail below.

The movable cover member 154 includes an upper wall 154*a*, a first side wall 154*b* having one end extending from one end of the upper wall 154*a*, a second side wall 154*c* having one end extending from another end of the upper wall 154*a* and an end wall 154*d* joined between the side walls 154*b* and 154*c* and joined to the upper wall 154*a*. In this configuration, the upper wall 154*a*, the side walls 154*b* and 154*c* and the end wall 154*d* form a structure with a hollow interior that can receive one or more low voltage conductors or one or more high voltage conductors. Similarly, the movable cover member 156 includes an upper wall 156*a*, a first side wall 156*b* having one end extending from one end of the upper wall 156*a* and a second side wall 156*c* having one end extending from another end of the upper wall 156*a* and an end wall 156*d* joined between the side walls 156*b* and 156*c* and joined to the upper wall 156*a*. In this configuration, the upper wall 156*a*, the side walls 156*b* and 156*c* and the end wall 156*d* form a structure with a hollow interior that can receive one or more low voltage conductors or one or more high voltage conductors. In this embodiment, the upper wall 154*a* of the movable cover member 154 is joined to the upper wall 152*a* of the main cover member 152 with a living hinge, and the upper wall 156*a* of the movable cover member 156 is joined to the upper wall 152*a* of the main cover member 152 with a living hinge so that the movable cover members 154 and 156 are pivotable between the open and closed positions relative to the main cover member 152.

Figure 23:
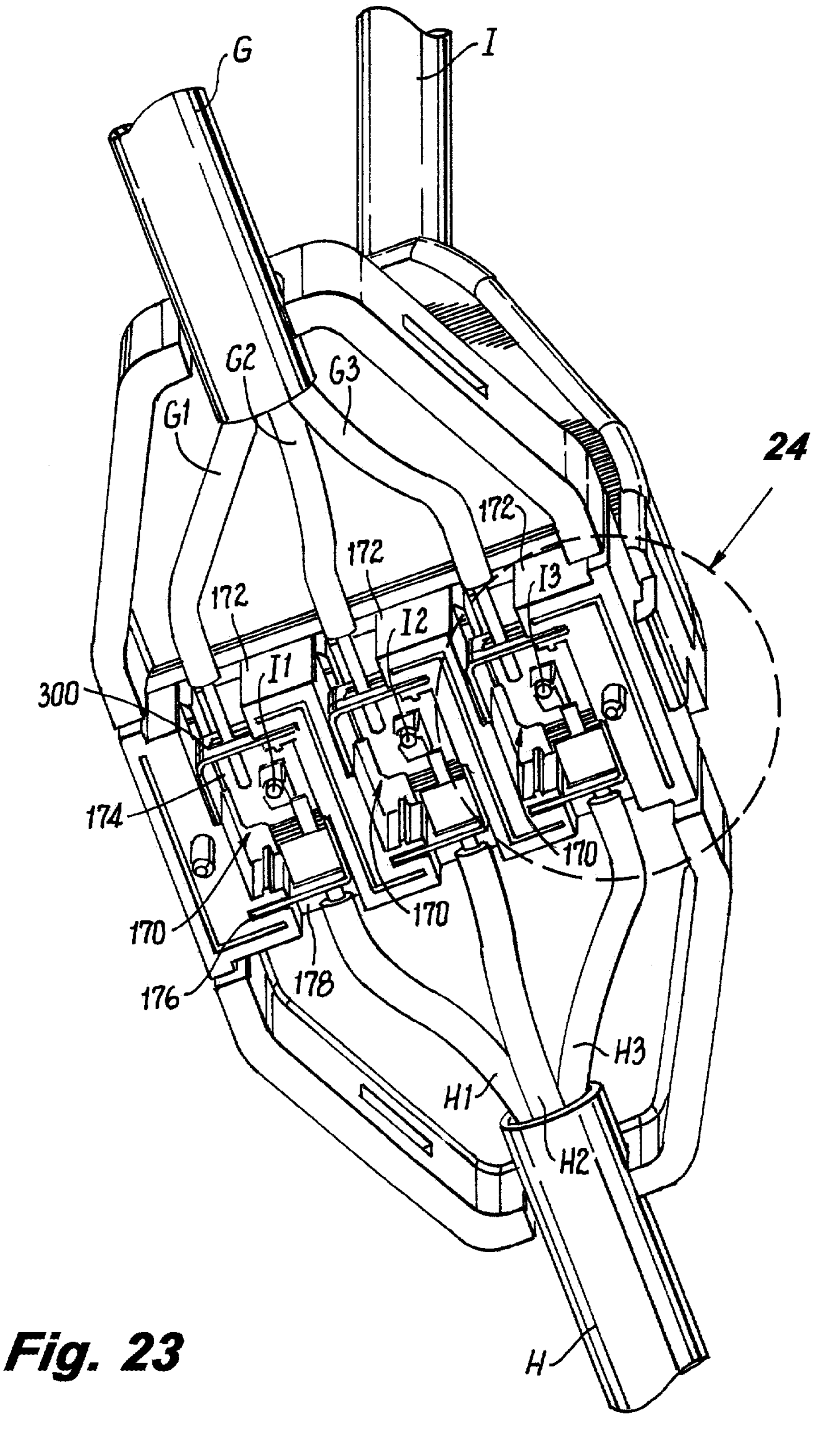
FIG. 23 is a bottom perspective view of the cover of the wire connector of FIG. 18, illustrating electrical contacts removably held within the cover electrically connecting a conductor from the supplemental wire connector and two conductors of the wire connector.

The main cover member 152 may also include one or more contact chambers 170 (e.g., see FIG. 23). The one or more contact chambers 170 are positioned within the hollow interior of the main cover member 152. In the embodiment shown, there are three contact chambers 170, where each contact chamber 170 is configured and dimensioned to house a single electrical contact 300. More specifically, in the embodiment shown, each contact chamber 170 includes one or more walls 172 that define a cavity 174 in which the at least one electrical contact 300 is installed. The one or more walls 172 may be integrally or monolithically formed into main cover member 152 or the one or more walls 172 may be secured to the main cover member 152 using, for example, welds or mechanical fasteners. An example of a weld is an ultrasonic weld. Each contact chamber 170 may include one or more contact mounting structures 176 used for securing or releasably securing the at least one electrical contact 300 within the cavity 174 of the contact chamber 170. In the exemplary embodiment shown in FIGS. 23 and 24, the contact mounting structures 176 are notches, channels or grooves in the walls 172 defining the particular contact chamber 170. The one or more walls 172 of each contact chamber 170 may also include one or more openings 178 that act as access points into the cavity 174 of the contact chamber 170. Preferably, the one or more openings 178 are adjacent to or in close proximity to the electrical contact 300 within the cavity 174 of the contact chamber 170. The openings 178 permit the low voltage or high voltage electrical conductors to pass through a contact chamber wall 172 to be electrically connected to the electrical contact 300 housed within the contact chamber 170. Preferably, as shown in FIG. 23, one opening 178 is disposed on one side of the contact chamber 170 so that electrical conductors in the first end portion 22*c* of the body 22 of the base 20*z* can be secured to an electrical contact 300, and another opening 178 is disposed on the opposite side of the contact chamber 170 so that electrical conductors in the second end portion 22*d* of the body 22 of the base 20*z* can be secured to a corresponding electrical contact 300 within the contact chamber 170. In addition, each opening 178 may be configured and dimensioned to receive one of the tabs 26*a* or 26*b* in the pair of tabs 26 extending from the body 22 of the base 20*z* (e.g., see FIG. 18) to form a portion of the contact chamber wall 172. Thus, when the cover 150*z* is coupled or secured to the base 20*z*, the tabs 26*a* and 26*b* is positioned between sides of the chamber walls 172 defining the opening 178 of the contact chamber 170 to at least partially block access to the electrical contact 200. As such, each tab 26*a* and 26*b* may be spaced from another tab 26*a* or 26*b* a distance that is equal to a thickness of the chamber wall 172 between each of the openings 178 of the contact chamber 170. Such a configuration allows the electrical contact 300 to be partly protected by one tabs 26*a* and 26*b* in the pair of tabs 26. The embodiment exemplified by FIG. 23 illustrates the main cover member 152 having three contact chambers 170 positioned in series, and each contact chamber 170 includes two openings 178. However, one skilled in the art would recognize that the main cover member 152 can have any number of contact chambers 170 which in turn may include any number of chamber wall openings 178.

Referring again to FIGS. 17 and 18, the supplemental wire connector 70 includes a cover member 72 and a body 74. The cover member 72 includes an upper wall 72*a*, a first side wall 72*b* having one end extending from one end of the upper wall 72*a*, a second side wall 72*c* having one end extending from another end of the upper wall 72*a*, and an end wall 72*d* joined between the side walls 72*b* and 72*c* and joined to the upper wall 72*a*. In this configuration, the upper wall 72*a*, the side walls 72*b* and 72*c*, and the end wall 72*d* form a structure with a hollow interior that can receive one or more low voltage conductors or one or more high voltage conductors. The body 74 is substantially planar and has a bottom wall 76 that extends away from the body 74 at one end. The bottom wall 76 may be integrally or monolithically formed into one end of the body 74. It is also noted, however, that the bottom wall 76 may be secured to one end of the body 74 using, for example, welds. The cover member 72 is movably connected to the bottom wall 76 using a living or integral hinge structure to form a unitary or monolithically structured supplemental wire connector 70. The bottom wall 76 has at least one wire receiving aperture 78. The embodiment illustrated in FIG. 18 has three wire receiving apertures 78 in series that align with the apertures 153 of the upper wall 152*a* of the main cover member 152 of the cover 150*z*, as shown in FIG. 19, that allow a conductor to communicate with an electrical contact 300 that resides in the contact chamber 170.

As noted above, the cover member 72 of the supplemental wire connector 70 is pivotably joined to the bottom wall 76 using a living or integral hinge structure. The movable cover member 72 of the supplemental wire connector 70 is dimensioned to align with the body 74 of the supplemental wire connector 70. To releasably secure the movable cover member 72 to the body 74, one or more supplemental cover coupling assemblies 90 may be used. In the embodiment shown in FIG. 18, the one or more supplemental cover coupling assemblies 90 are snap fit joints. In this embodiment, two supplemental cover coupling assemblies 90 are used to releasably secure the movable cover member 72 of the supplemental wire connector 70 to the body 74 of the supplemental wire connector 70. Each supplemental cover coupling assembly 90 may include a cantilever beam 482 and a matching recess or opening 484. The cantilever beam 482 extends from the body 74 of the supplemental wire connector 70, as shown in FIG. 18, and has a free end 482*a*. The cantilever beam 482 includes a tapered hook 486 at its free end 482*a*. The matching recesses or openings 484 are located in the side walls, 72*b* and 72*c*, of the cover member 72 and positioned to align with the tapered hook 486 of the cantilever beam 482 when the cover member 72 of the supplemental wire connector 70 is in a closed position, shown in FIG. 17.

A supplemental wire connector 70 according to an illustrative embodiment of the present disclosure is described in more detail by reference to FIGS. 27, 27A. In this embodiment, the wire receiving apertures 78 formed in the bottom wall 76 of supplemental wire connector 70 include a connector contact 80 that resides within each wire receiving aperture 78. The connector contact 80 may be secured in the wire receiving aperture 78 by friction fit, adhesives, or mechanical fasteners. For example, as shown, one or more tines 83 may be provided around the periphery of contact 80 for helping secure contact 80 in receiving aperture 78. The connector contact 80 includes a hollow cylindrical body 82, a collar 84, and a contact 86. The connector contact 80 is made of a material that is electrically conductive. Non-limiting examples of electrically conductive material that may be used include but are not limited to, for example, copper, copper alloy, phosphor bronze, aluminum or brass. For ease of description, the body 82 of the connector contact 80 may be divided into a first end 82*a* and a second end 82*b*. The first end 82*a* of the body 82 is configured to accommodate a conductor, e.g., a wire, to be inserted therein. For example, where supplemental wire connector 70 is to accommodate line voltage conductors, the first end 82*a* may be dimensioned to receive line voltage conductors generally in the 10 AWG to 14 AWG range. Where supplemental wire connector 70 is to accommodate low voltage conductors, the first end 82*a* may be dimensioned to receive low voltage conductors generally in the 18 AWG to 24 AWG range. The collar 84 may be integrally or monolithically formed into the body 82 of the connector contact 80 at generally the first end 82*a*. The collar 84 may also be secured to the connector contact 80 by other means, for example, welds. The contact 86 may be integrally or monolithically formed into the second end 82*b* of the body 82 of the connector contact 80 so that the contact 86 extends away from the first end 82*a* of the body 82 a sufficient distance to allow the contact 86 to be able to pass through the apertures 153 of the main cover member 152 and interact with the electrical contact 300 residing in the contact chamber 170. It is contemplated that the contact 86 may be attached to the second end 82*b* of the body 82 by other means including, for example, welds. The contact 86 may be a pin-type or a blade-type contact. The interior of the body 82 may also include at least one tooth 88 configured to allow the advancement of a conductor into the connector contact 80 while limiting or preventing the withdrawal of the conductor from the connector contact 80. The at least one tooth 88 may also pierce the outer diameter of the inserted conductor to ensure electrical conductivity is maintained between the connector contact 80 and the inserted conductor. According to the non-limiting embodiment illustrated in FIG. 27A, the interior of the body 82 has two teeth 88 for gripping the inserted conductor and maintaining electrical conductivity between the conductor and the connector contact 80.

Figure 28:
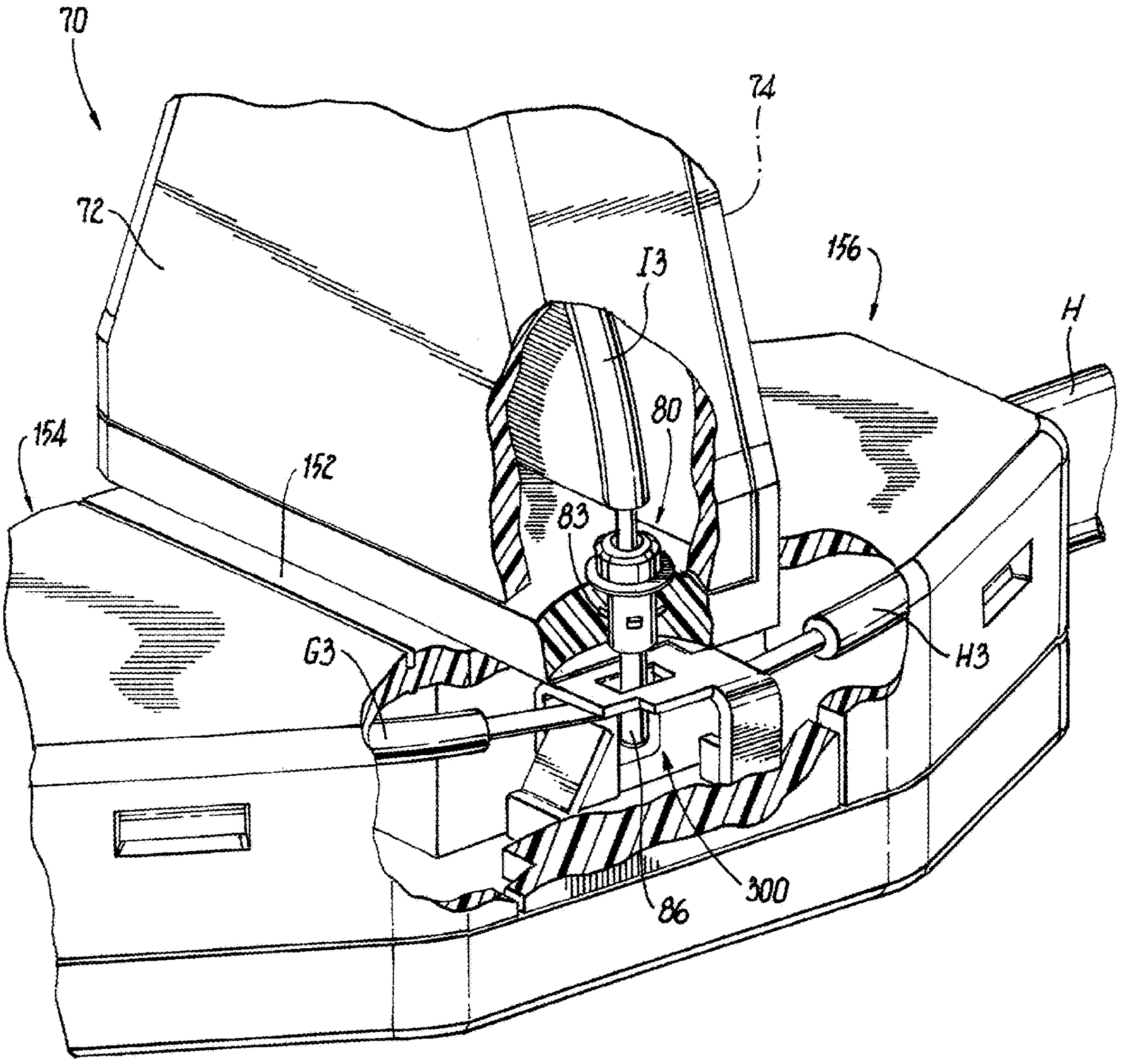
FIG. 28 is a cross-sectional view of the wire connector of FIG. 17 taken from detail 28 of FIG. 17, and illustrating a contact chamber of the cover holding an electrical contact configured to accommodate a connector contact so that the three conductors are electrically connected.

As depicted in FIG. 28, the spliced end of conductor I3 is press fit into connector contact 80 of supplemental wire connector 70 and contact 86 extends from the bottom thereof. When supplemental wire connector 70 is attached to cover 152, contact 86 extends through the orifice in cover 152 and connects to electrical contact 300 as shown. Alternatively, or in addition, it will be appreciated that contacts 80 may be provided in cover 152 so that contact 86 extends into electrical contact 300 and such that the spliced end of conductor I3 or the contact 86 extending from supplemental wire connector 70 (e.g., see FIG. 22) is received in connector contact 80.

Figure 24:
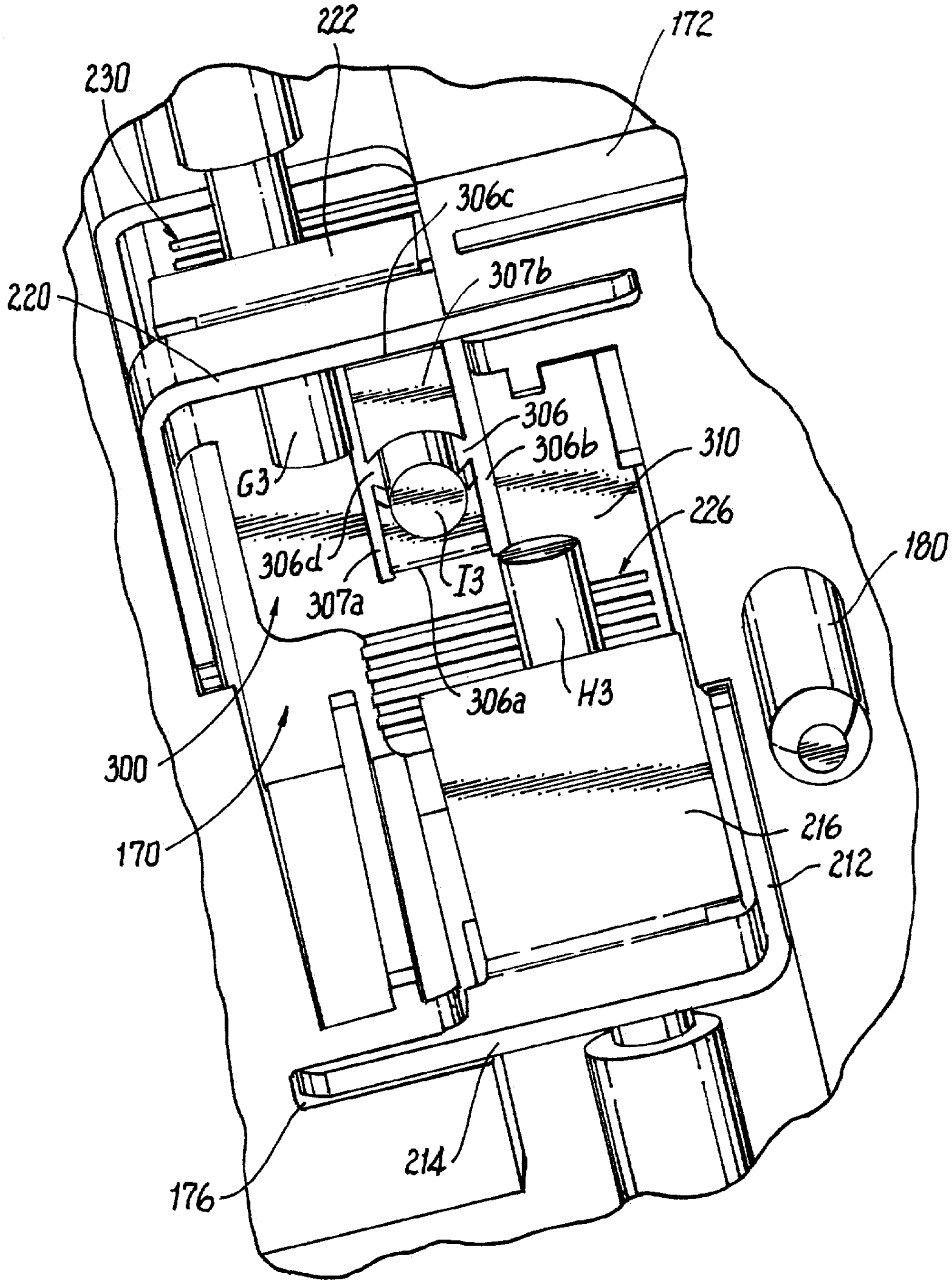
FIG. 24 is an enlarged view of an electrical contact positioned in the contact chamber of FIG. 23, illustrating the contact chamber of the cover holding the electrical contact which is electrically connecting three electrical conductors.

Referring now to FIGS. 24-26, an exemplary embodiment of an electrical contact 300 and 400 are shown. The electrical contacts 300 and 400 illustrated in the FIGS. 24-26 are substantially similar to the electrical contact 200 described above with respect to FIGS. 6-7. Similar element numbers for similar portions of electrical contacts 300, 400 and 200 are used. However, according to the present illustrative embodiment depicted in FIG. 24, the electrical contact 300 has an opening 306 in the contact plate 310. According to the present illustrative embodiment depicted in FIG. 26, the electrical contact 400 has an opening 406 in the contact plate 410.

For ease of description, the electrical contact 300 may be divided into a first contact portion 202 and a second contact portion 204 that are interconnected such that an electrical path is formed between the first contact portion 202 and a second contact portion 204. In the embodiment shown, the first contact portion 202 includes a portion of a contact plate 310, a first stabilizing arm 212, a first mounting arm 214 and a first contact arm 216. Similarly, the second contact portion 204 includes a portion of a contact plate 310, a second stabilizing arm 218, a second mounting arm 220 and a second contact arm 222. In the embodiment shown, the first and second contact portions 202 and 204 are formed as a unitary or monolithic structure, and a portion of the contact plate 310 provides the electrical path between the first contact portion 202 and the second contact portion 204.

The portion of the contact plate 310 within the first contact portion 202 has a contact area including one or more contact enhancing surfaces 226 configured to increase the frictional force between the contact plate 310 and bare low voltage or high voltage electrical conductors positioned between the contact plate 310 and the first contact arm 216. The contact enhancing surfaces 226 may be in the form of knurling, teeth or other surfaces capable of increasing the frictional force between the contact plate 310 and the electrical conductors. Non-limiting examples of other surfaces capable of increasing the frictional force include bumpy, coarse and/or gnarled surfaces. Similarly, the portion of the contact plate 310 within the second contact portion 204 has a contact area including one or more contact enhancing surfaces 230 configured to increase the frictional force between the contact plate 310 and bare low voltage or high voltage electrical conductors, positioned between the contact plate 310 and the second contact arm 222. The contact enhancing surfaces 230 may be in the form of knurling, teeth or other surfaces capable of increasing the frictional force between the contact plate 310 and the electrical conductors. Non-limiting examples of other surfaces capable of increasing the frictional force include bumpy, coarse and/or gnarled surfaces.

The first stabilizing arm 212 includes a first end 212*a* extending from a first side 210*a* of the contact plate 310 and is substantially perpendicular to the contact plate 210. However, the first stabilizing arm 212 may be at an angle relative to the contact plate 310. A first mounting arm 214 is at or near a second end 212*b* of the first stabilizing arm 212 and extends from a side of the first stabilizing arm 212 such that the first mounting arm 214 is substantially perpendicular to the first stabilizing arm 212. However, first mounting arm 214 may be at an angle relative to the first stabilizing arm 212. The first contact arm 216 extends from the first mounting arm 214 towards the contact plate 310. The first contact arm 216 is configured such that the first contact arm 216 is able to flex, e.g., bend, when a conductor is inserted between the contact plate 310 and the first contact arm 216 permitting forward advancement of the conductor between the contact plate 310 and the first contact arm 216 while limiting or preventing withdrawal of the conductor from between the contact plate 310 and the first contact arm 216. When a conductor is inserted between the contact plate 310 and the first contact arm 216, the first contact arm 216 cooperates with the contact enhancing surface 226 to secure the conductor to the first contact portion 202 of the electrical contact 300.

The second stabilizing arm 218 includes a first end 218*a* extending from a second side 210*b* of the contact plate 310 and is substantially perpendicular to the contact plate 310. However, the second stabilizing arm 218 may be at an angle relative to the contact plate 310. A second mounting arm 220 is at or near a second end 218*b* of the second stabilizing arm 218 and extends from a side of the second stabilizing arm 218 such that the second mounting arm 220 is substantially perpendicular to the second stabilizing arm 218. However, second mounting arm 220 may be at an angle relative to the second stabilizing arm 218. The second contact arm 222 extends from the second mounting arm 220 towards the contact plate 310. The second contact arm 222 is configured such that the second contact arm 220 is able to flex, e.g., bend, when a conductor is inserted between the contact plate 310 and the second contact arm 222 permitting forward advancement of the conductor between the contact plate 310 and the second contact arm 222 while limiting or preventing withdrawal of the conductor from between the contact plate 310 and the second contact arm 222. When a conductor is inserted between the contact plate 310 and the second contact arm 222, the second contact arm 222 cooperates with the contact enhancing surface 230 to secure the conductor to the second contact portion 204 of the electrical contact 200.

The opening 306 is a generally square or rectangular opening, however, any shape of the opening that allows for a conductor to pass through the opening 306 and into the electrical contact 300 may be suitable. The opening 306 is preferably centrally located on the contact plate 310. In the embodiment shown in FIG. 25, the opening 306 has a first side 306*a*, a second side 306*b*, a third side 306*c*, and a fourth side 306*d*. The opening 306 may include contact grips, e.g., 307*a* and 307*b*, configured to allow the advancement of a conductor therethrough while limiting or preventing its withdrawal from the electrical contact 200. In particular, the first contact grip 307*a* extends from the first side 306*a* and a second contact grip 307*b* extends from the third side 306*c*. The contact grips, 307*a* and 307*b*, are configured such that the contact grips are able to flex, e.g., bend, when a conductor is inserted between the two contact grips, 307*a* and 307*b*, permitting advancement of the conductor between the two contact grips while preventing withdrawal of the conductor from between the first contact grip 307*a* and the second contact grip 307*b*.

An electrical contact according to another illustrative embodiment of the present disclosure is shown in FIG. 26 and is referred to as contact 400. Contact 400 includes an opening 406 which is generally centrally located on the contact plate 410. that allows for a conductor to pass through the opening 306 and into the electrical contact 300 may be suitable The opening 406 is a generally square or rectangular opening, however, any shape of the opening that allows for a conductor to pass through opening 406 and into electrical contact 400 may be suitable. In the present embodiment, the opening 406 has a first side 406*a*, a second side 406*b*, a third side 406*c*, and a fourth side 406*d*. The opening 406 may include contact grips, e.g., 408*a* and 408*b*, configured to allow the advancement of a conductor therethrough while limiting or preventing its withdrawal from the electrical contact 400. In particular, the first contact grip 408*a* extends from the second side 406*b* and a second contact grip 408*b* extends from the fourth side 406*d*. The contact grips, 408*a* and 408*b*, are configured such that the contact grips are able to flex, e.g., bend, when a conductor is inserted between the two contact grips, 408*a* and 408*b*, permitting advancement of the conductor between the two contact grips while preventing withdrawal of the conductor from between the first contact grip 408*a* and the second contact grip 408*b*.

As illustrated in FIGS. 22-24, the electrical contact 300 (or 400) may be fitted into the contact chamber 170. Grooves in the walls 172 of the contact chamber 170 forming the contact mounting structure 176 are configured to receive the first mounting arm 214 and the second mounting arm 220. Also shown in FIG. 24 is an example of three electrical conductors G3, H3, and I3, (e.g., three-line voltage conductors or three low voltage conductors) connected to the electrical contact 300. Electrical conductor H3 is clamped between the first contact arm 216 and the contact enhancing surface 226 of the contact area of the contact plate 310. Friction from the contact enhancing surface 226 and the force applied by the first contact arm 216 against the electrical conductor H3 causes the electrical conductor H3 to be attached to the electrical contact 300. Electrical conductor G3 is clamped between the second contact arm 222 and the contact enhancing surface 230 of the contact area of the contact plate 310. Friction from the contact enhancing surface 230 and the force applied by the second contact arm 222 against the electrical conductor G3 causes the electrical conductor G3 to be attached to the electrical contact 300. Electrical conductor I3 is clamped between the first contact grip 307*a* and the second contact grip 307*b*. The force applied by both contact grips, 307*a* and 307*b*, against the electrical conductor I3 causes the electrical conductor I3 to be electrically connected to the electrical contact 300. As a result, an electrical connection between the conductors G3, H3, and I3 is established.

Now referring again to FIGS. 17 and 18, to secure the supplemental wire connector 70 with the cover 150*z* of the wire connector 10*z* one or more supplemental wire connector coupling assemblies, e.g., 420, may be used. In the exemplary embodiment shown, the one or more supplemental wire connector coupling assemblies 420, are snap fit joints. However, the present disclosure contemplates other fasteners to secure the supplemental wire connector 70 to the cover 150*z* of the wire connector 10*z*. Non-limiting examples include nuts and bolts, and welds, such as ultrasonic welds. In the embodiment shown, supplemental wire connector coupling assemblies 420 are snap fit joints that are used to secure the supplemental wire connector 70 to the cover 150*z* of the wire connector 10*z*. The supplemental wire connector coupling assembly 420 includes a cantilever beam 422 and a matching lip 424. As shown in FIG. 18, the cantilever beam 422 extends from the bottom wall 76 of the supplemental wire connector 70 in a direction away from the supplemental wire connector 70. The cantilever beam 422 has a free end that includes a tapered hook 426. A matching lip 424 which receives tapered hook 426 is located on the first side wall 152*c* of the main cover member 152 of the cover 150*z*. The matching lip 424 is positioned on the first side wall 152*c* of the main cover member 152 of the cover 150*z* to align with the tapered hook 426 of the cantilever beam 422 when the supplemental wire connector 70 is positioned to be coupled to the cover 150*z* of the wire connector 10*z*. Although not shown in FIGS. 17 and 18, a similar coupling assembly 420 may be provided on the opposite sides of supplemental wire connector 70 and cover 150*z*.

When coupling the supplemental wire connector 70 to the cover 150*z* of the wire connector 10*z*, the supplemental wire connector 70 is positioned adjacent the cover 150*z* of the wire connector 10*z* as shown in FIG. 18 so the respective cantilever beams 422 are aligned with their corresponding matching lips 424. The supplemental wire connector 70 is then pressed against the cover 150*z* of the wire connector 10*z* so that the conductors extending from supplemental wire connector 70 are seated within connector 300 (or 400) and so that the supplemental wire connector coupling assemblies 420 couple the supplemental wire connector 70 and cover 150*z* locking them together.

Figure 29:
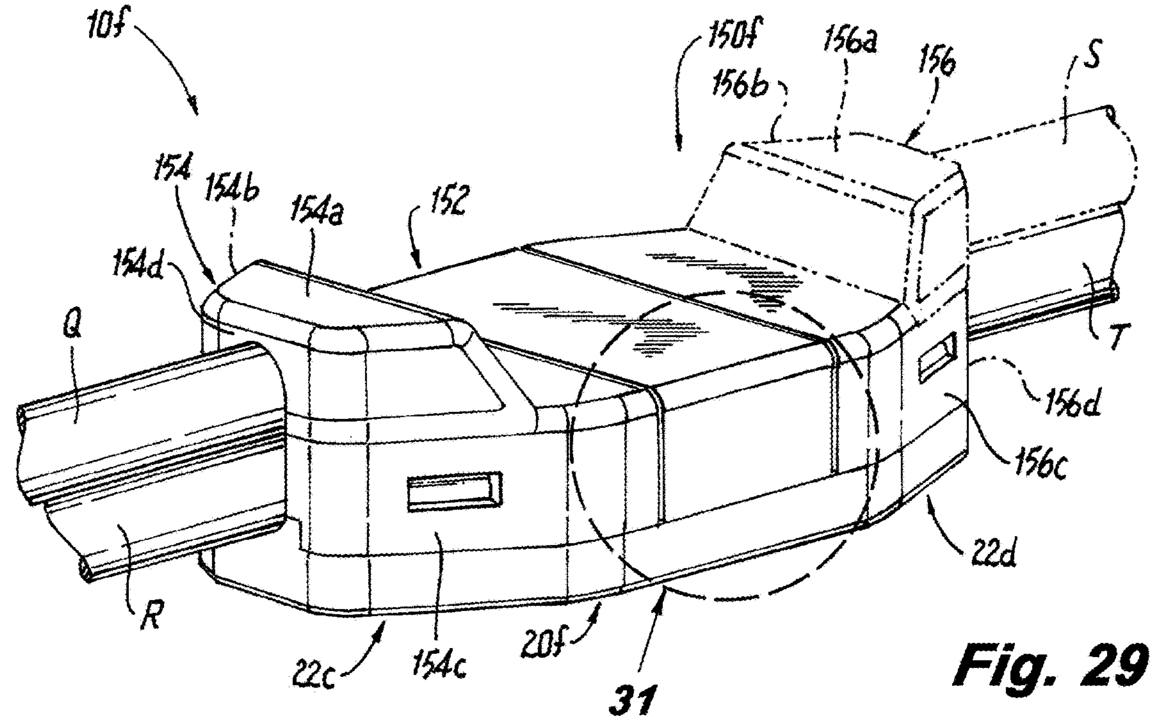
FIG. 29 is a perspective view of an exemplary embodiment of a low-profile wire connector configured to accommodate multiple conductors per side of the wire connector.
Figure 30:
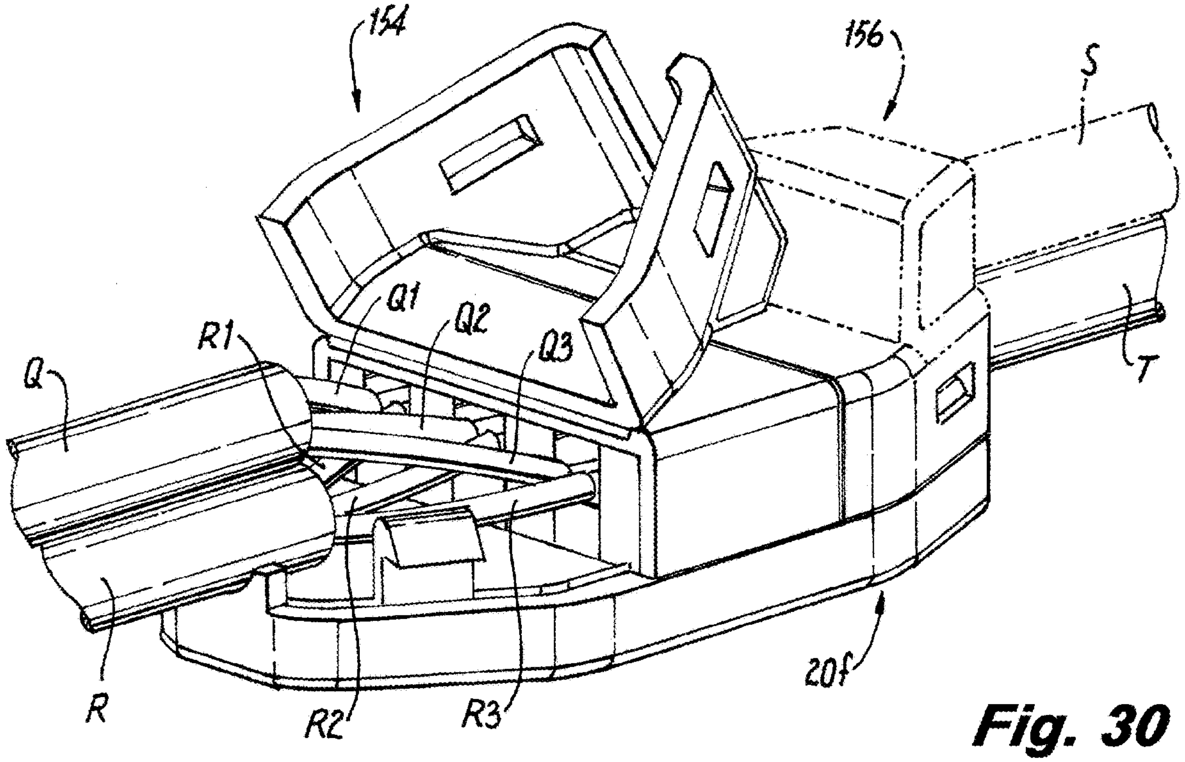
FIG. 30 is a perspective view of the wire connector of FIG. 29, illustrating one side of the cover open and showing the conductors of cable Q and R sharing a corresponding electrical contact.
Figure 31:
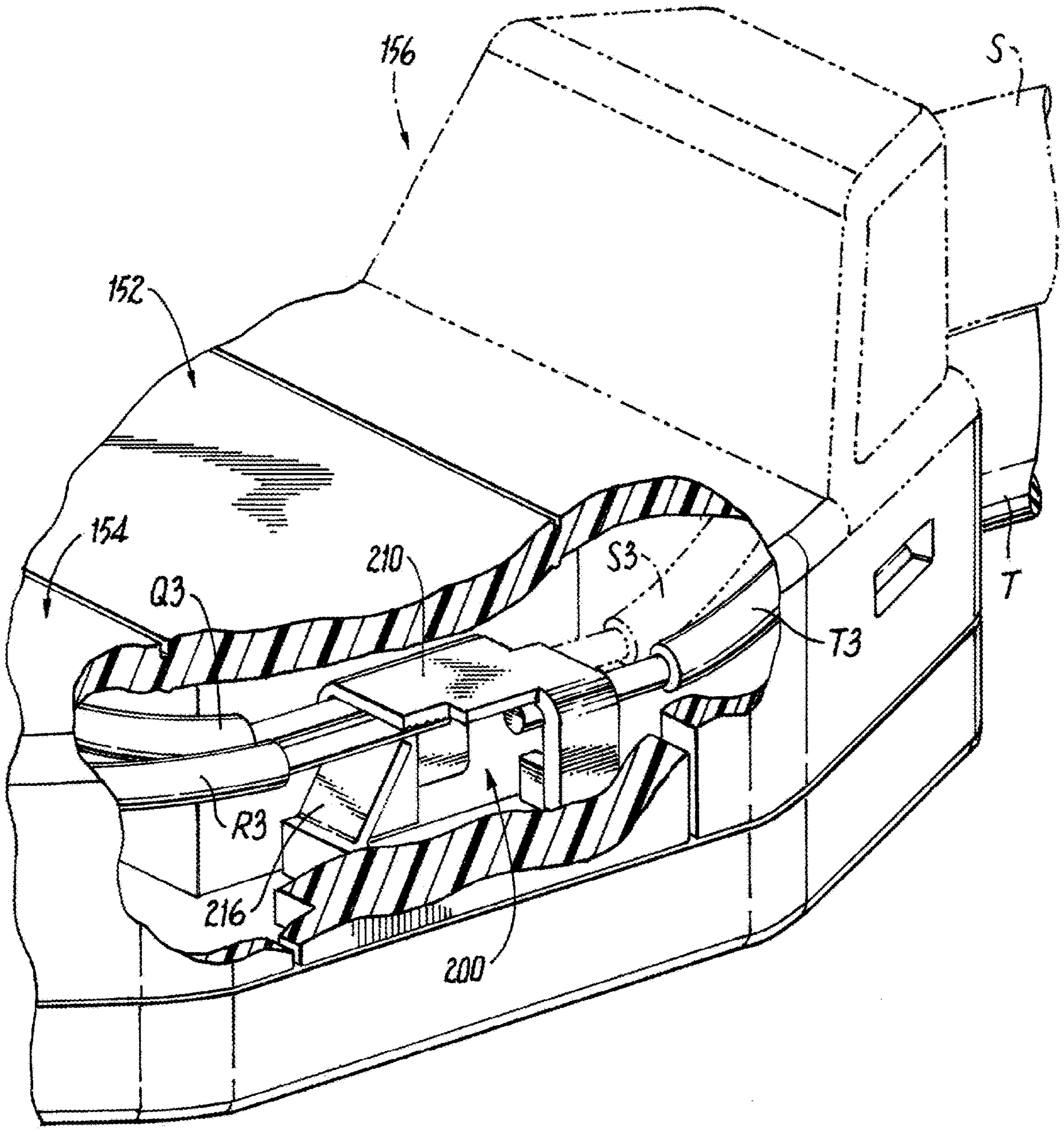
FIG. 31 is a cross-section view of a portion of the wire connector of FIG. 29 taken from detail 31 of FIG. 29, illustrating the electrical contact accommodating two conductors per side of the electrical contact.

Referring to FIGS. 29-31, an exemplary embodiment of a wire connector 10*f* is shown. The wire connector 10*f* is configured to connect or splice cables Q and R to cables S and T. The electrical cables Q, R, S, and T may include a set of electrical conductors rated for line voltages that supply electrical power, or the electrical cables Q, R, S, and T may include a set of electrical conductors rated for low voltages to provide control signals. As a non-limiting example, the line voltage conductors may be 10 AWG to 14 AWG conductors, and the low voltage conductors may be 18 AWG to 24 AWG conductors. In the exemplary embodiment shown, the cable Q includes a set of electrical conductors Q1, Q2, Q3 that are individually insulated by a first insulating sleeve or jacket with a second insulating sleeve or jacket surrounding the set. Similarly, the cable R includes a set of electrical conductors R1, R2, R3 that are individually insulated by a first insulating sleeve or jacket with a second insulating sleeve or jacket surrounding the set. Furthermore, the cable S includes a set of electrical conductors S1, S2, S3 that are individually insulated by a first insulating sleeve or jacket with a second insulating sleeve or jacket surrounding the set. Likewise, the cable T includes a set of electrical conductors T1, T2, T3 that are individually insulated by a first insulating sleeve or jacket with a second insulating sleeve or jacket surrounding the set.

Continuing to refer to FIGS. 29-31, in this exemplary embodiment, the wire connector 10*f* includes a base 20*f* and a cover 150*f* The base 20*f* is substantially the same as the base 10 described above with respect to previous embodiments and for the sake of brevity will not be described again here. The cover 150*f* is substantially similar to the cover 150 described above with respect to previous embodiments, except that the first side wall 154*b*, the second side wall 154*c*, and the end wall 154*d* of the movable cover member 154 of the cover 150*f* are taller to accommodate the additional cable (e.g., cable Q). In addition, depending on a particular embodiment, the first side wall 156*b*, the second side wall 156*c*, and the end wall 156*d* of the movable cover member 156 of the cover 150*f* may also be taller to accommodate the additional cable (e.g., cable S). As seen in FIG. 29, the taller side walls, 154*b*, 154*c*, 156*b*, and 156*c*, as well as the taller end walls 154*d* and 156*d* create a vertical oblong opening that is capable of accommodating more than one cable in the first end portion 22*c* of the body 20 of wire connector 10*f* and similarly, in the second end portion 22*d* of the body of wire connector 10*f* FIG. 31 shows a partial cutaway view of FIG. 29 showing how two wires, R3 and Q3, from two cables, R and Q, respectively, may be inserted between the contact plate 210 and the first contact arm 216 of an electrical contact 200 and how two wires, S3 and T3 from two cables S and T, respectively, may be inserted between the contact plate 210 and the second contact arm 222 (not shown) so that all four conductors R3, Q3, S3 and T3 are electrically connected.

Figure 32:
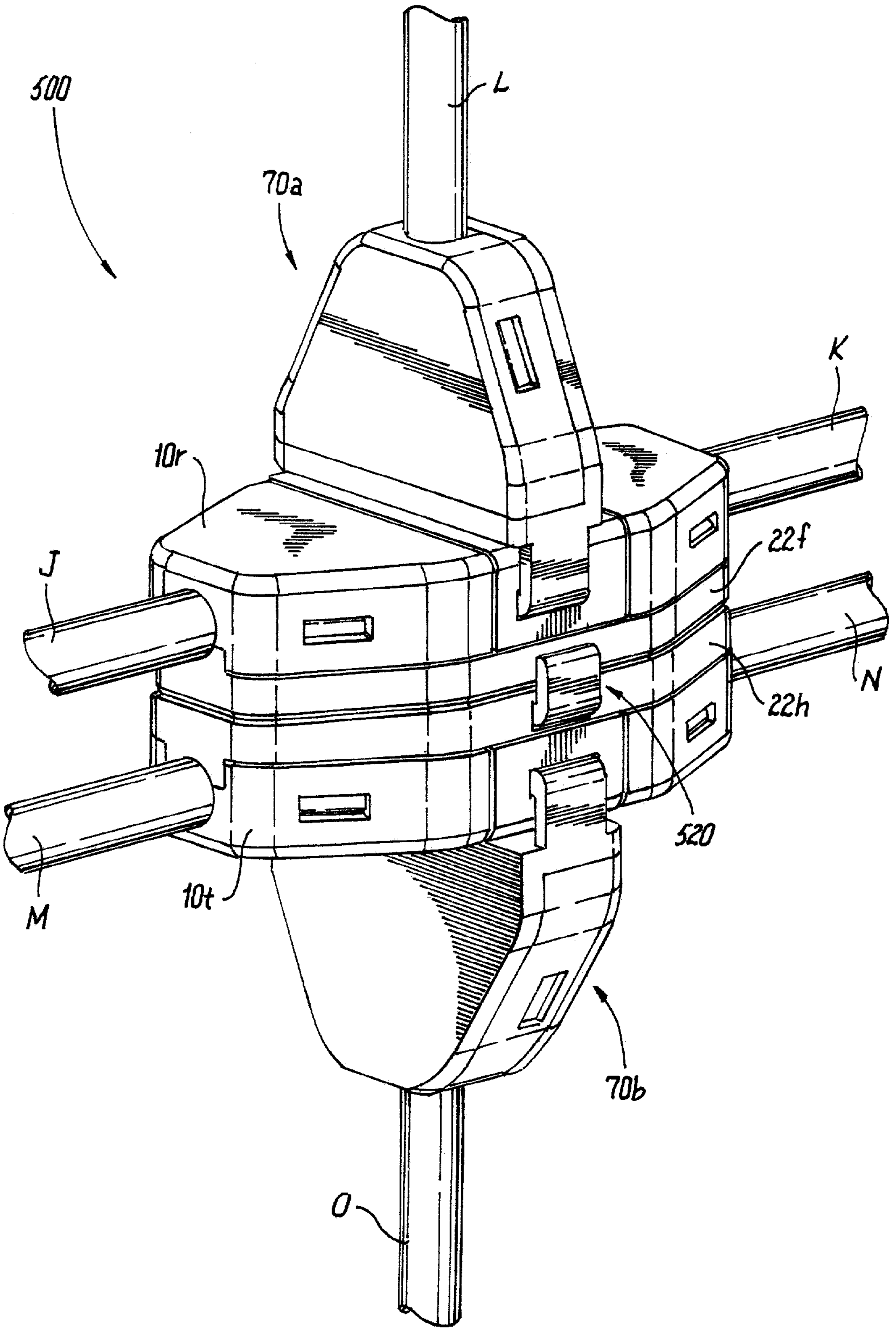
FIG. 32 is a perspective view of another exemplary embodiment of a low-profile connector assembly according to the present disclosure, illustrating two wire connectors of FIG. 17 coupled together.

Referring now to FIG. 32, just as the previous embodiment wire connectors 10 described above with respect to FIGS. 1-7 may be coupled together, two wire connectors 10*r* and 10*t* may also be coupled together along with supplemental cable connectors 70*a* and 70*b* as shown, to form a wire connector assembly 500. In the embodiment shown, each wire connector 10*r* and 10*t* is substantially the same as the wire connectors 10*z* described above with respect to FIGS. 17-28 such that a detailed description of the wire connectors is not repeated.

Figure 33:
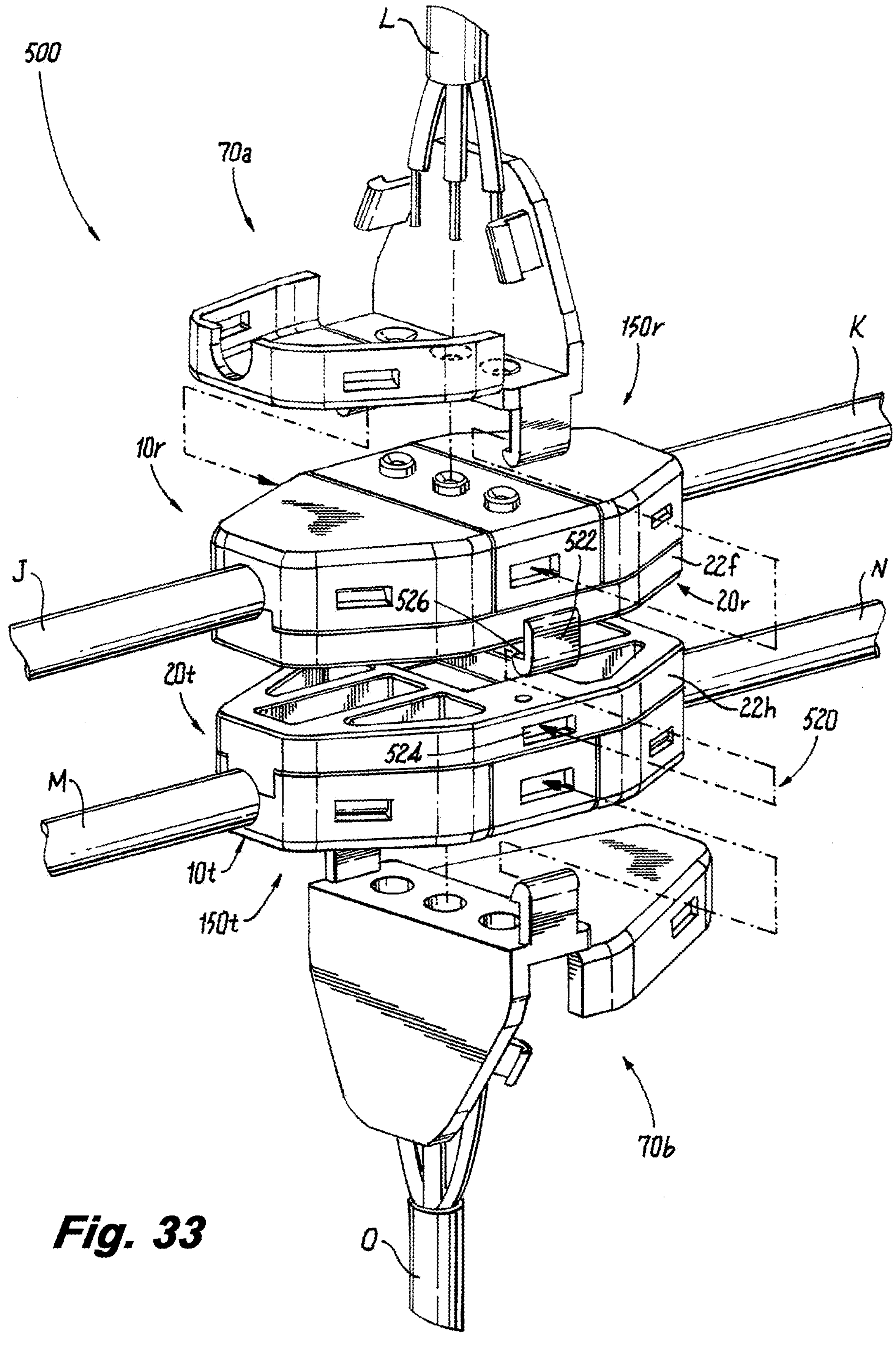
FIG. 33 is an exploded perspective view of the low-profile connector assembly of FIG. 32, illustrating cables and components of the two wire connectors including covers, bases, and supplemental wire connectors.

In the exemplary embodiment of FIGS. 32-33, the wire connector 10*r* and supplemental connector 70*a* receive and splice electrical conductors in line voltage cables J, K, and L. The wire connector 10*t* and supplemental connector 70*b* receive and splice electrical conductors in low voltage cables M, N, and O. Each cable J, K, and L may include a double insulated set of electrical conductors rated for line voltages, and each cable M, N, and O may include a double insulated set of electrical conductors rated for low voltages. The line voltage cables J, K, and L may be used to provide electrical power. The cable J includes a set of line voltage conductors (not shown) that are individually insulated by a first insulating sleeve or jacket with a second insulating sleeve or jacket surrounding the set. Similarly, the cable K includes a set of line voltage conductors (not shown) that are individually insulated by a first insulating sleeve or jacket with a second insulating sleeve or jacket surrounding the set. Furthermore, the cable L includes a set of line voltage conductors (not shown) that are individually insulated by a first insulating sleeve or jacket with a second insulating sleeve or jacket surrounding the set. The low voltage cables M, N, and O may be used for control/signaling purposes. The cable M includes a set of low voltage conductors (not shown) that are individually insulated by a first insulating sleeve or jacket with a second insulating sleeve or jacket surrounding the set. Similarly, the cable N includes a set of low voltage conductors (not shown) that are individually insulated by a first insulating sleeve or jacket with a second insulating sleeve or jacket surrounding the set. Furthermore, the cable O includes a set of low voltage conductors (not shown) that are individually insulated by a first insulating sleeve or jacket with a second insulating sleeve or jacket surrounding the set.

As shown in FIGS. 32 and 33, to secure the wire connector 10*r* to the wire connector 10*t*, one or more base coupling assemblies 520 may be used. In the exemplary embodiment shown, the one or more base coupling assemblies 520 are snap fit joints. However, the present disclosure contemplates other fasteners to secure the wire connector 10*r* to the wire connector 10*t*. Non-limiting examples include nuts and bolts, and welds, such as ultrasonic welds. It is further contemplated that base coupling assemblies 320 and 330 described above with respect to FIGS. 11-14 may be used in place of base coupling assemblies 520 or in conjunction with base coupling assemblies 520. In the embodiment shown, base coupling assemblies 520 are snap fit joints that are used to secure wire connectors 10*r* and 10*t* together. The base coupling assemblies 520 may include snap fit joints which include cantilever beam 522 including hook 526 and corresponding lip 524. In the embodiment shown, the cantilever beam 522 extends from the outer wall 22*f* of the body 22 of the base 20*r* in a direction away from the cover 150*r*, as shown in FIG. 33. The cantilever beam 522 may be integrally or monolithically formed into the outer wall 22*f* of the body 22 of the base 20*r*. It is noted however, that the cantilever beam 522 may be secured to the outer wall 22*f* of the body 22 using, for example, welds. The cantilever beam 522 has a free end that includes a tapered hook 526. The corresponding lip 524 for receiving the tapered hook 526 is located in the outer wall 22*h* of the body 20*t* of the first wire connector 10*t*. The lip 524 is positioned on the outer wall 22*h* of the body 20*t* to align with the tapered hook 526 of the cantilever beam 522 when the base 20*t* of the first wire connector 10*t* is positioned to be coupled to the base 20*r* of the second wire connector 10*r*, as shown in FIGS. 32 and 33. Although not shown in FIGS. 32 and 33, a similar base coupling assembly 520 may be provided on the opposite side of base 20*r* and base 20*t*.

When coupling the first wire connector 10*t* to the second wire connector 10*r*, the base 20*t* of the first wire connector 10*t* is positioned adjacent the base 20*r* of the second wire connector 10*r* as shown in FIGS. 32 and 33 so that the respective cantilever beams, 522, are aligned with their corresponding matching lips 524. The base 20*t* of the first wire connector 10*t* is then pressed against the base 20*r* of the second wire connector 10*r* so that the base coupling assemblies 320 couple the bases 20*t* and 20*r* together. The supplemental wire connectors 70*a*, 70*b* are attached to the first and second wire connectors 10*t*, 10*r* in a manner similar to that described above with respect to other embodiments.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description. For example, because the first wire connector 10*x* and the second wire connector 10*y* may splice different size electrical conductors, components of the first wire connector 10*x* may differ in size from components of the second wire connector 10*y*. To accommodate the larger line voltage conductors, each single electrical contact 200 and associated contact chamber 170 may be larger than their counterparts for low voltage conductors.

What is claimed is:

1. A wire connector assembly comprising:

a first wire connector including:

a first base having a first end portion, a second end portion and a central portion, the first base having an upper wall and a lower wall;

a first cover having a main cover member, a first movable cover member movably connected to a first side of the main cover member and a second movable cover member movably connected to a second side of the main cover member, the first cover being attached to the first base such that the main cover member of the first cover is associated with the central portion of the first base, the first movable cover member of the first cover is associated with the first end portion of the first base and the second movable cover member of the first cover is associated with the second end portion of the first base, the main cover member of the first cover including a plurality of contact chambers, each contact chamber of the main cover member of the first cover including at least one electrical contact positioned within a cavity of the contact chamber, the electrical contact providing at least two entry for conductors positioning from opposite direction, a first passage to the first end portion of the first base and a second passage to the second end portion of the first base;

a first cover coupling assembly associated with the first end portion of the first base and the first movable cover member of the first cover and used to releasably couple the first movable cover member of the first cover to the first end portion of the first base; and a second cover coupling assembly associated with the second end portion of the first base and the second movable cover member of the first cover and used to releasably couple the second movable cover member of the first cover to the first end portion of the first base; and a second wire connector including:

a second base having a first end portion, a second end portion and a central portion, the second base having an upper wall and a lower wall;

a second cover having a main cover member, a first movable cover member movably connected to a first side of the main cover member and a second movable cover member movably connected to a second side of the main cover member, the second cover being attached to the second base such that the main cover member of the second cover is associated with the central portion of the second base, the first movable cover member of the second cover is associated with the first end portion of the second base and the second movable cover member of the second cover is associated with the second end portion of the second base, the main cover member of the second cover including a plurality of contact chambers, each contact chamber of the main cover member of the second cover including at least one electrical contact positioned within a cavity of the contact chamber, the electrical contact providing at least two entry for conductors positioning from opposite direction, a first passage to the first end portion of the second base and a second passage to the second end portion of the second base;

a third cover coupling assembly associated with the first end portion of the second base and the first movable cover member of the second cover and used to releasably couple the first movable cover member of the second cover to the first end portion of the second base; and a fourth cover coupling assembly associated with the second end portion of the second base and the second movable cover member of the second cover and used to releasably couple the second movable cover member of the second cover to the first end portion of the second base;

wherein the first base of the first wire connector is attached to the second base of the second wire connector.

2. The wire connector assembly of claim 1, wherein the main cover member further comprises at least one aperture configured to provide access to the electrical contact within the contact chamber.

3. The wire connector assembly of claim 2, wherein the at least one aperture further comprises a knockout configured to be removed to allow access therethrough.

4. The wire connector assembly of claim 2, wherein the at least one aperture further comprises a plug configured to be removed to allow access therethrough.

5. The wire connector assembly of 2, further comprising a supplemental wire connector having a body and a movable cover movably connected to the body, the body including at least one aperture configured to receive a conductor;

a supplemental wire connector coupling assembly associated with the body and the movable cover member of the supplemental wire connector and used to releasably couple the movable cover member of the supplemental wire connector to the body; and wherein the supplemental wire connector is configured to couple with the main cover member so that the at least one aperture of the main cover member align with the at least one aperture of the supplemental wire connector.

6. The wire connector of claim 5, wherein the at least one aperture houses a connector contact configured to receive and retain a conductor so that the conductor is electrically connected with the connector contact.

7. The wire connector of claim 6, wherein the connector contact is at least one of a pin-type and a blade-type connector contact.

8. The wire connector of claim 1, wherein the first movable cover is configured to accommodate more than one cable and wherein the second movable cover is configured to accommodate more than one cable.

9. A wire connector comprising:

a base having a first end portion, a second end portion and a central portion, the base having an upper wall and a lower wall;

a cover having a main cover member, a first movable cover member movably connected to a first side of the main cover member and a second movable cover member movably connected to a second side of the main cover member, the cover being attached to the base such that the main cover member is associated with the central portion of the base, the first movable cover member is associated with the first end portion of the base and the second movable cover member is associated with the second end portion of the base, the main cover member of the cover including a plurality of contact chambers, each contact chamber of the main cover member including at least one electrical contact positioned within a cavity of the contact chamber, a first passage to the first end portion of the base and a second passage to the second end portion of the base;

a first cover coupling assembly associated with the first end portion of the base and the first movable cover member of the cover and used to releasably couple the first movable cover member of the cover to the first end portion of the base; and a second cover coupling assembly associated with the second end portion of the base and the second movable cover member of the cover and used to releasably couple the second movable cover member of the cover to the first end portion of the base.

10. The wire connector according to claim 9, wherein the main cover member further comprises at least one aperture configured to provide access to the electrical contact within the contact chamber.

11. The wire conductor of claim 10, wherein the at least one aperture further comprises a knockout configured to be removed to allow access therethrough.

12. The wire conductor of claim 10, wherein the at least one aperture further comprises a plug configured to be removed to allow access therethrough.

13. The wire connector of claim 10, further comprising a supplemental wire connector having a body and a movable cover movably connected to the body, the body including at least one aperture configured to receive a conductor;

a supplemental wire connector coupling assembly associated with the body and the movable cover member of the supplemental wire connector and used to releasably couple the movable cover member of the supplemental wire connector to the body; and wherein the supplemental wire connector is configured to couple with the main cover member so that the apertures of the main cover align with the apertures of the supplemental wire connector.

14. The wire connector of claim 13, wherein the at least one aperture houses a connector contact configured to receive and retain a conductor so that the conductor is electrically connected with the connector contact.

15. The wire connector of claim 14, wherein the connector contact is at least one of a pin-type and a blade type connector contact.

16. The wire connector of claim 9, wherein the first movable cover is configured to accommodate more than one cable and wherein the second movable cover is configured to accommodate more than one cable.

* * * * *